US011128622B2

(12) United States Patent
Wu et al.

(10) Patent No.: US 11,128,622 B2
(45) Date of Patent: Sep. 21, 2021

(54) METHOD FOR PROCESSING DATA REQUEST AND SYSTEM THEREFOR, ACCESS DEVICE, AND STORAGE DEVICE

(71) Applicant: TENCENT TECHNOLOGY (SHENZHEN) COMPANY LIMITED, Guangdong (CN)

(72) Inventors: Yong Dong Wu, Shenzhen (CN); Feiling Fu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 108 days.

(21) Appl. No.: 16/018,259

(22) Filed: Jun. 26, 2018

(65) Prior Publication Data
US 2018/0302404 A1  Oct. 18, 2018

Related U.S. Application Data

(63) Continuation of application No. PCT/CN2017/101442, filed on Sep. 12, 2017.

(30) Foreign Application Priority Data

Sep. 13, 2016 (CN) .......................... 201610821976.4

(51) Int. Cl.
*H04L 29/06* (2006.01)
*H04L 29/08* (2006.01)

(52) U.S. Cl.
CPC ...... *H04L 63/0876* (2013.01); *H04L 63/0884* (2013.01); *H04L 63/10* (2013.01); *H04L 67/10* (2013.01); *H04L 67/1097* (2013.01)

(58) Field of Classification Search
CPC ..... H04L 63/0884; H04L 63/10; H04L 67/10; H04L 67/1097; H04L 63/0876
(Continued)

(56) References Cited

U.S. PATENT DOCUMENTS 5,560,008 A * 9/1996 Johnson .............. G06F 21/6218
709/229
6,954,854 B1 * 10/2005 Miura ..................... G06F 21/10
380/278
(Continued)

FOREIGN PATENT DOCUMENTS

CN  101764839 A  6/2010
CN  102204267 A  9/2011
(Continued)

OTHER PUBLICATIONS

Written Opinion dated Dec. 8, 2017 from the International Bureau in application No. PCT/CN2017/101442.
(Continued)

*Primary Examiner* — Farid Homayounmehr
*Assistant Examiner* — Thanh T Le
(74) *Attorney, Agent, or Firm* — Sughrue Mion, PLLC

(57) ABSTRACT

A method for processing a data request is performed by an access device, and includes receiving, from a user terminal, the data request including data information of target data, obtaining the data information from the data request, searching for a storage device identifier and first authentication information, based on the data information, and sending the first authentication information and the data information, to a storage device corresponding to the storage device identifier, to enable the storage device to perform authentication on the first authentication information, and to enable the storage device to, in response to the authentication succeeding, obtain the target data indicated by the data information. The method further includes receiving, from the storage device, the target data, and sending the target data to the user terminal, to respond to the data request.

20 Claims, 16 Drawing Sheets

(58) Field of Classification Search
USPC .................................................... 726/4
See application file for complete search history.

(56) References Cited

U.S. PATENT DOCUMENTS

| | | | | |
|---|---|---|---|---|
| 7,653,947 | B2* | 1/2010 | Hatano | G03G 15/5091 726/32 |
| 8,732,852 | B2* | 5/2014 | Shu | H04L 63/08 726/28 |
| 8,799,322 | B2* | 8/2014 | deMilo | G06F 21/602 707/791 |
| 8,850,516 | B1* | 9/2014 | Hrebicek | G06F 16/1734 726/1 |
| 9,401,904 | B1* | 7/2016 | Hankins | H04L 63/0807 |
| 9,509,694 | B2* | 11/2016 | Parmar | H04L 63/0807 |
| 10,038,694 | B1* | 7/2018 | Chakraborty | H04L 63/10 |
| 10,262,151 | B2* | 4/2019 | McFerrin | G06F 21/6218 |
| 2003/0233370 | A1* | 12/2003 | Barabas | G06F 16/278 |
| 2008/0271034 | A1* | 10/2008 | Miyata | G06F 3/0631 718/104 |
| 2008/0307510 | A1* | 12/2008 | Sakakibara | H04N 1/444 726/4 |
| 2009/0328155 | A1* | 12/2009 | Madathilparamgil George | G06F 9/468 726/4 |
| 2010/0011364 | A1 | 1/2010 | Gerovac et al. | |
| 2010/0268908 | A1* | 10/2010 | Ouyang | G06F 11/2094 711/170 |
| 2012/0303962 | A1* | 11/2012 | Ghani | G06F 21/6209 713/176 |
| 2013/0219061 | A1* | 8/2013 | Wong | H04L 63/102 709/225 |
| 2014/0013423 | A1* | 1/2014 | Jain | G06F 21/31 726/19 |
| 2014/0101116 | A1 | 4/2014 | Alnafoosi et al. | |
| 2014/0181965 | A1* | 6/2014 | Kling | H04L 63/105 726/21 |
| 2015/0020179 | A1* | 1/2015 | Yokoyama | H04L 63/08 726/7 |
| 2015/0143136 | A1* | 5/2015 | Barney | H04L 9/14 713/193 |
| 2015/0180872 | A1* | 6/2015 | Christner | H04L 63/10 726/4 |
| 2015/0256474 | A1* | 9/2015 | Ringdahl | G06F 9/46 709/226 |
| 2015/0278243 | A1 | 10/2015 | Vincent et al. | |
| 2015/0324371 | A1 | 11/2015 | Guo | |
| 2015/0381729 | A1 | 12/2015 | Manohar et al. | |
| 2016/0028699 | A1* | 1/2016 | Ambroz | H04L 9/3242 713/168 |
| 2016/0042194 | A1* | 2/2016 | Chakraborty | G06F 3/0622 726/17 |
| 2016/0087960 | A1* | 3/2016 | Pleau | H04L 63/104 726/7 |
| 2016/0092443 | A1* | 3/2016 | Hayes | G06F 21/6209 726/28 |
| 2017/0034064 | A1* | 2/2017 | Everhart | G06F 9/5011 |
| 2017/0034165 | A1* | 2/2017 | Bagal | G06F 13/102 |
| 2017/0147545 | A1* | 5/2017 | Amoli | G06Q 10/10 |
| 2017/0302734 | A1* | 10/2017 | Liang | H04L 67/1097 |

FOREIGN PATENT DOCUMENTS

| | | |
|---|---|---|
| CN | 103870202 A | 6/2014 |
| CN | 104272274 A | 1/2015 |
| CN | 105353976 A | 2/2016 |

OTHER PUBLICATIONS

International Search Report of PCT/CN2017/101442 dated Dec. 8, 2017.

* cited by examiner

METHOD FOR PROCESSING DATA REQUEST AND SYSTEM THEREFOR, ACCESS DEVICE, AND STORAGE DEVICE

CROSS-REFERENCE TO RELATED APPLICATIONS

This application is a continuation of International Patent Application No. PCT/CN2017/101442 filed on Sep. 12, 2017, which claims priority from Chinese Patent Application No. 201610821976.4, filed on Sep. 13, 2016, in the Chinese Patent Office, which are incorporated herein by reference in their entireties.

BACKGROUND

1. Field

Methods and apparatuses consistent with embodiments relate to the field of Internet technologies, and in particular, to a method for processing a data request and a system therefor, an access device, and a storage device.

2. Description of Related Art

With continuous development and perfection of Internet technologies, because of good expandability and disaster tolerance of a distributed storage manner, the distributed storage manner is generally used for storing data a big data network environment. However, an existing process of requesting for data in a storage device of distributed storage is that a user terminal requests an access device for data, storage device information corresponding to the data is synchronized to the access device, and the access device may access a corresponding storage device according to the storage device information to obtain the data and return the data to the user terminal. However, during implementation, there is still a phenomenon that the access device fails to obtain the data specified by the user terminal, or the obtained data is not the data requested by the user terminal. Consequently, there is a problem of a low accuracy rate and a low success rate in responding to a data request. In addition, because an error in the returned data may be that the returned data is data of another user, the data may be leaked. Hence, there is also a problem of low data security.

SUMMARY

According to embodiments, there is provided a method for processing a data request, the method being performed by an access device, and the method including receiving, from a user terminal, the data request including data information of target data, obtaining the data information from the data request, searching for a storage device identifier and first authentication information, based on the data information, and sending the first authentication information and the data information, to a storage device corresponding to the storage device identifier, to enable the storage device to perform authentication on the first authentication information, and to enable the storage device to, in response to the authentication succeeding, obtain the target data indicated by the data information. The method further includes receiving, from the storage device, the target data, and sending the target data to the user terminal, to respond to the data request.

According to embodiments, there is provided a method for processing a data request, the method being performed by a storage device, and the method including receiving, from an access device, data information of target data and first authentication information associated with the data information, the data information being obtained by the access device from the data request that is received from a user terminal, and the first authentication information being searched for by the access device, based on the data information. The method further includes performing authentication on the first authentication information, in response to the authentication succeeding, obtaining the target data indicated by the data information, and sending the target data, to the access device, to enable the access device to send the target data to the user terminal to respond to the data request.

According to embodiments, there is provided an access device including at least one memory configured to store computer program code, and at least one processor configured to access the at least one memory and operate according to the computer program code. The computer program code includes data information obtaining code configured to cause the at least one processor to receive, from a user terminal, a data request including data information of target data, and obtain the data information from the data request, and information sending code configured to cause the at least one processor to search for a storage device identifier and first authentication information, based on the data information, and send the first authentication information and the data information, to a storage device corresponding to the storage device identifier, to enable the storage device to perform authentication on the first authentication information, and to enable the storage device to, in response to the authentication succeeding, obtain the target data indicated by the data information. The computer program code further includes first data sending code configured to cause the at least one processor to receive, from the storage device, the target data, and send the target data to the user terminal, to respond to the data request.

DESCRIPTION OF EMBODIMENTS

Figure 1:
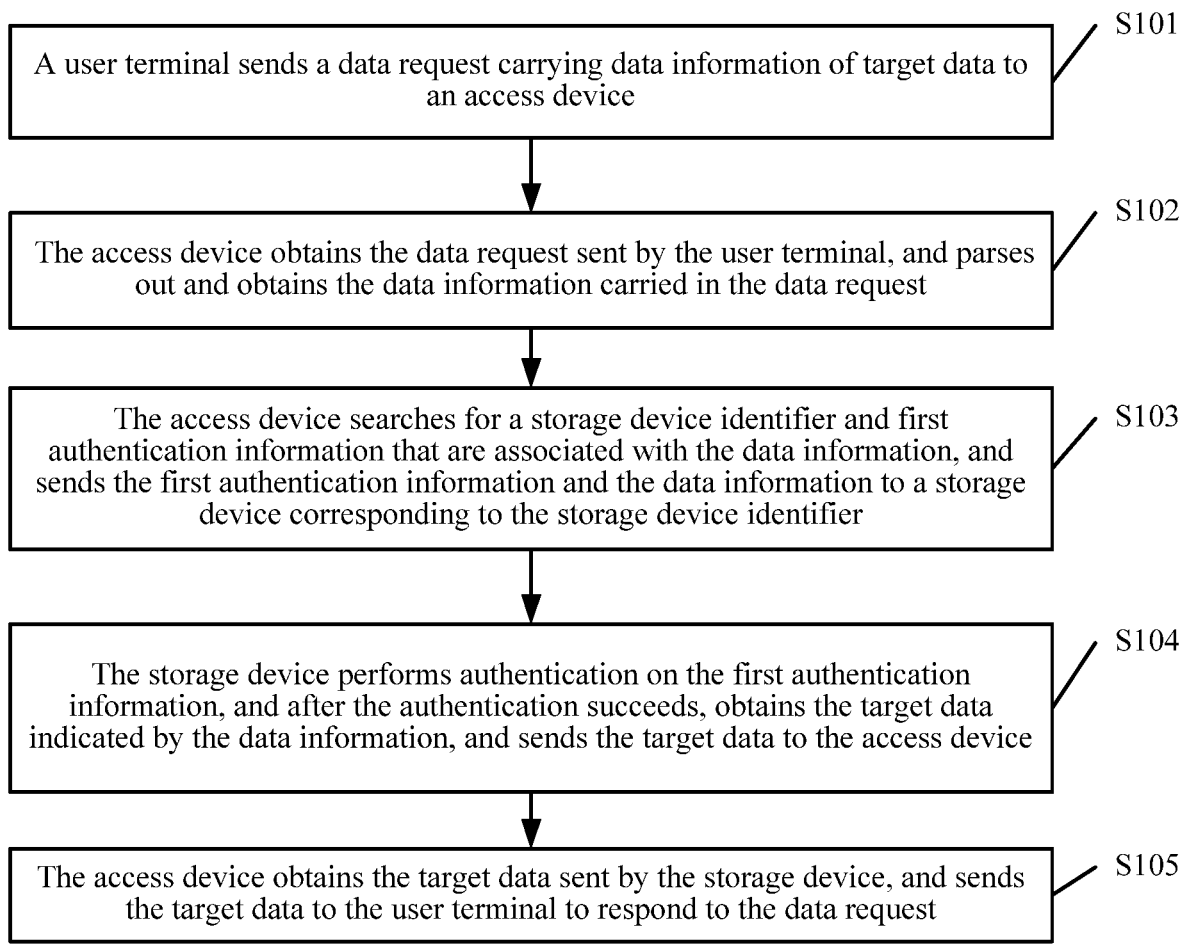
FIG. 1 is a schematic flowchart of a method for processing a data request according to an embodiment.

The following clearly and completely describes the technical solutions in the embodiments of this application with reference to the accompanying drawings in the embodiments of this application. Apparently, the described embodiments are some embodiments of this application rather than all of the embodiments. All other embodiments obtained by a person of ordinary skill in the art based on the embodiments of this application without creative efforts shall fall within the protection scope of this application.

It is found through research that it is likely that data requested by a user terminal cannot be accurately or successfully provided because a communication fault occurs in a current access device, a current storage device is faulty, or a current storage device is migrating data. If the access device is faulty, because stored device information corresponding to the data cannot be synchronized to the access device timely, a failure to obtain the data is likely to be caused. Moreover, when the data is migrated or the user terminal stores new data to the storage device by using another access device, an error in the obtained data is likely to be caused. Accuracy of the requested data and security of data storage are affected. With regard to this, a method for processing a data request by the embodiments of this application can be applied to in a scenario of a data request in distributed storage, for example, a scenario in which a user terminal sends a data request carrying data information of target data to an access device, the access device obtains the data request sent by the user terminal and parses out and obtains the data information carried in the data request, the access device searches for a storage device identifier and first authentication information that are associated with the data information and sends the first authentication information and the data information to a storage device corresponding to the storage device identifier, the storage device performs authentication on the first authentication information and after the authentication succeeds, obtains the target data indicated by the data information and sends the target data to the access device, and the access device obtains the target data sent by the storage device, and sends the target data to the user terminal to respond to the data request. The first authentication information associated with the data information of the requested data is added, and the requested data can be obtained only after the authentication on the first authentication information succeeds, to avoid a case that erroneous data is obtained because the data is migrated or replaced with new other data, thereby ensuring accuracy and security of the requested data.

The user terminal used in the embodiments of this application may be a terminal device having a data accessing function such as a tablet computer, a personal computer (PC), a smartphone, a palmtop computer, and a mobile Internet device (MID). The access device may be a switch device docked with the user terminal and the storage device in distributed storage, and is configured to receive a data request or a data storing request from the user terminal, access the storage device to perform data access, and so on. The storage device may be a backend storage device in distributed storage, may include a plurality of servers, and is configured to store data sent by the access device and send corresponding data to the access device in response to a data request. A management device may be a central node in distributed storage and is configured to manage the access device and the storage device in a distributed system and manage metadata information including a resource utilization ratio and a data index.

The following describes the method for processing a data request according to the embodiments of this application in detail with reference to FIG. 1 to FIG. 6.

FIG. 1 is a schematic flowchart of a method for processing a data request according to an embodiment. As shown in FIG. 1, the method in this embodiment of this application is described from perspectives of a user terminal side, an access device side, and a storage device side together. The method may include the following step S101 to step S105.

S101: A user terminal sends a data request carrying data information of target data to an access device.

Optionally, the user terminal may send the data request carrying the data information of the target data to a currently connected access device. The data information may optionally be data attributes, such as a data name and a data type, of the target data.

S102: The access device obtains the data request sent by the user terminal, and parses out and obtains the data information carried in the data request.

Optionally, the access device obtains the data request sent by the user terminal, and may parse the data request and obtain the data information carried in the data request.

S103: The access device searches for a storage device identifier and first authentication information that are associated with the data information, and sends the first authentication information and the data information to a storage device corresponding to the storage device identifier.

Optionally, the access device searches for a storage device identifier and first authentication information that are associated with the data information. It could be understood that the storage device identifier may be a device identifier of a storage device that is assigned by the management device according to relevant information, such as a resource utilization ratio, of current distributed storage in a process of storing the target data and that stores the target data. The device identifier herein may be a device number of the storage device, a storage number assigned by the management device to the storage device, a resource identifier assigned to a storage resource when the management device performs unified storage resource scheduling, or the like. In a word, the storage device identifier herein may be an indication identifier of different types of information, such as a sequence number or a character string, that can be uniquely located to a storage device.

The first authentication information may optionally be route information that is selected by the management device from an information pool for the target data and that uniquely matches the target data.

The access device may send the first authentication information and the data information to the storage device corresponding to the storage device identifier.

S104: The storage device performs authentication on the first authentication information, and after the authentication succeeds, obtains the target data indicated by the data information, and sends the target data to the access device.

Optionally, the storage device receives the data information and the first authentication information that are sent by the access device. Optionally, the storage device may first perform authentication on the first authentication information, and only after the authentication on the first authentication information succeeds, allows the access device to access the target data. For example, S104 may be that: after the authentication on the first authentication information succeeds, the storage device queries for the target data according to the data information, and sends the found target data to the access device.

It could be understood that if the authentication on the first authentication information fails, the storage device denies access of the access device to the target data. In some embodiments, the storage device may directly send a failure indicator of an access failure to the access device. In some other embodiments, the storage device may alternatively send prompt information indicating a data obtaining failure and the like to the access device. The prompt information may include: a prompt indicating a possible reason for the failure, for example, a prompt indicating that the authentication on the first authentication information fails, or for example, a prompt indicating that currently provided first authentication information is incomplete when the first authentication information is incomplete, or a prompt indicating that current first authentication information does not exist when the first authentication information does not exist. In this way, the access device can forward the prompt information to the user terminal, to help the user terminal perform adjustment. On the one hand, user satisfaction is improved, and on the other hand, the user terminal is helped as much as possible to obtain desired data.

S105: The access device obtains the target data sent by the storage device, and sends the target data to the user terminal to respond to the data request. That is, the access device receives the target data from the storage device. After the target data is received, the target data is sent to the user terminal that the requests for reading the target data.

In this embodiment of this application, when obtaining the data request carrying the data information of the target data sent by the user terminal, the access device may obtain the storage device identifier associated with the data information and may obtain the preset first authentication information associated with the data information, the first authentication information and the data information are sent to the storage device corresponding to the storage device identifier, so that the storage device performs authentication on the first authentication information, and after the authentication succeeds, the target data indicated by the data information is returned to the access device, and finally, the access device sends the target data to the user terminal to respond to the data request. The first authentication information associated with the data information of the requested data is added, and the requested data can be obtained only after the authentication on the first authentication information succeeds, to avoid a case that erroneous data is obtained because the data is migrated or replaced with new other data, thereby ensuring accuracy and security of the requested data.

Figure 2:
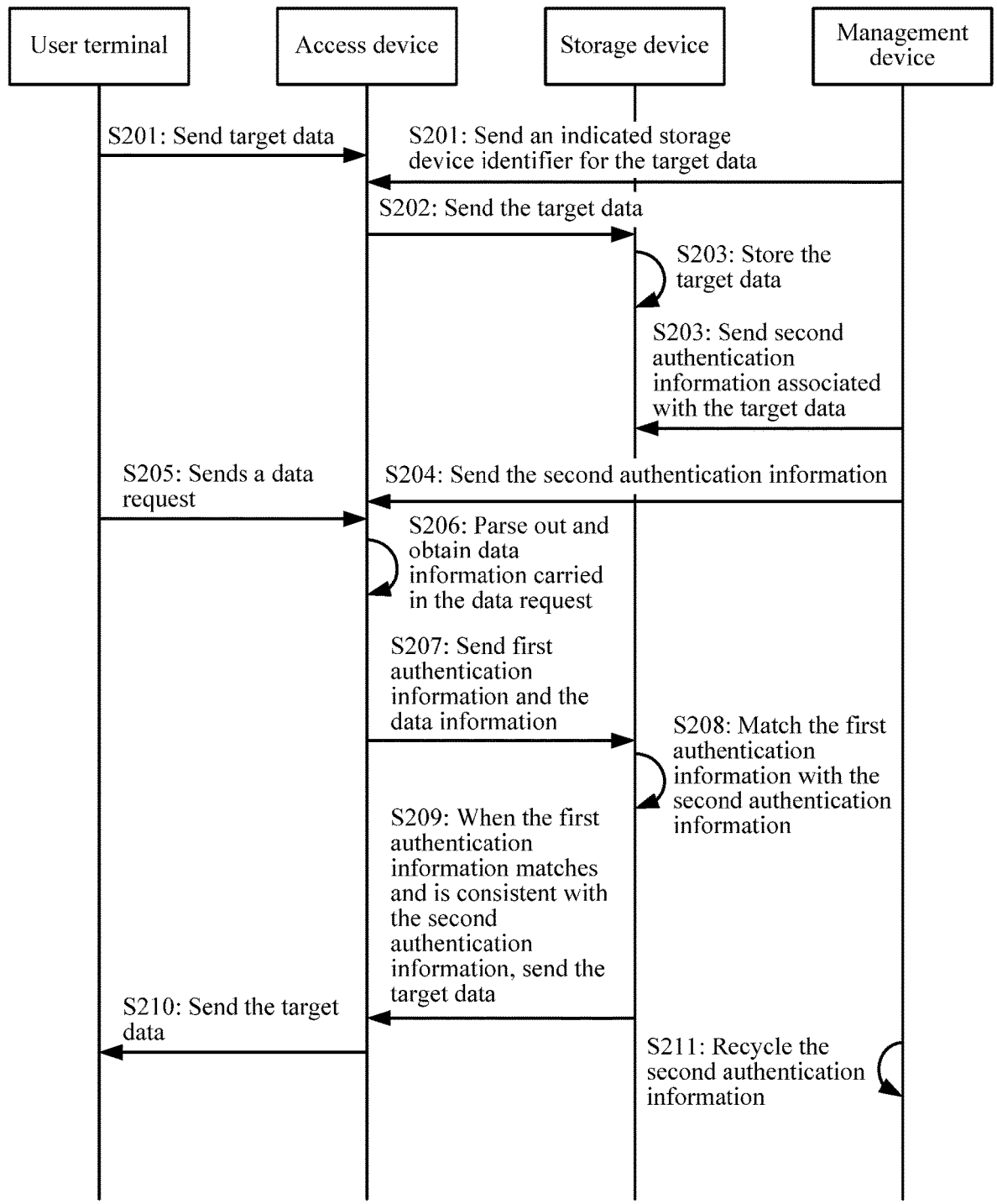
FIG. 2 is a procedure sequence diagram of a method for processing a data request according to an embodiment.

FIG. 2 is a procedure sequence diagram of a method for processing a data request according to an embodiment. As shown in FIG. 2, the method in this embodiment of this application is described from perspectives of a user terminal side, an access device side, and a storage device side together. The method may include the following step S201 to step S211.

S201: An access device obtains target data sent by a user terminal, and obtains a storage device identifier indicated by a management device for the target data.

Optionally, the user terminal may store in advance the target data to the storage device by using the access device. In this way, the user terminal may send target data that currently needs to be stored to a currently connected access device. The target data that currently needs to be stored herein may be data that would be subsequently queried for. For example, the user terminal may back up, based on a user instruction or an internal instruction, one or more pieces of data in to-be-stored data, such as an address book, a picture, music or a film that a user likes, and other user data, in a mobile phone to a distributed storage system on a network side. In this way, proper deletion may be performed locally on the mobile phone, to avoid a phenomenon that a local storage space of the mobile phone is excessively occupied. Moreover, the to-be-stored data, such as an address book and a picture, uploaded to the distributed storage system is queried for as the target data that would be subsequently requested for by the user terminal. Further, the access device would receive the target data sent by the user terminal, and after receiving the target data, forward the target data to a distributed storage platform including a plurality of storage devices for storage. At the same time, the access device may further request the management device for the storage device identifier of the storage device storing the data sent by the access device. The management device may indicate a storage device identifier for the target data according to relevant information, such as a resource utilization ratio, in current distributed storage and at the same time, update a data index. The access device obtains the storage device identifier indicated by the management device.

In some embodiments, the access device adds the to-be-stored data that the user terminal requests for storing to a storing request, the management device would receive the storing request, and after receiving the storing request, the management device selects, according to storage-related storage status information, such as a storage resource utilization ratio, a quantity of current available storage resources, a current available storage resource rate, and a current storage load, of each storage device, a storage device for storing the to-be-stored information, and sends the to-be-stored data carried in the storing request to the selected storage device for storage. The management device may further return a storage response to the storage device. The storage response may carry information such as the storage device identifier, and is returned to the access device. In this way, after the access device receives the storage response, it can be considered that distributed storage of information whose storage is designated by the user terminal is completed.

S202: The access device sends the target data to a storage device corresponding to the storage device identifier.

S203: The storage device stores the target data and obtains second authentication information that is sent by the management device and that is associated with the target data.

Optionally, the access device may send the target data to the storage device corresponding to the storage device identifier, and the storage device receives the target data sent by the access device and stores the target data. In some embodiments, the second authentication information may also serve as a component of the storage response.

After the storage device stores the target data, the management device may send second authentication information associated with the target data to the management device. The second authentication information may optionally be route information that uniquely matches the target data. The storage device obtains the second authentication information sent by the management device.

S204: The access device obtains the second authentication information synchronized by the management device.

Optionally, the management device may alternatively synchronize the second authentication information to the access device, and the access device obtains the second authentication information synchronized by the management device.

S205: The user terminal sends a data request carrying data information of the target data to the access device.

Optionally, the user terminal may send the data request carrying the data information of the target data to a currently connected access device. The data information may optionally be data attributes, such as a data name and a data type, of the target data.

S206: The access device obtains the data request sent by the user terminal, and parses out and obtains the data information carried in the data request.

Optionally, the access device obtains the data request sent by the user terminal, and may parse the data request and obtain the data information carried in the data request.

S207: The access device searches for the storage device identifier and first authentication information that are associated with the data information, and sends the first authentication information and the data information to the storage device corresponding to the storage device identifier.

Optionally, the access device searches for the storage device identifier and first authentication information that are associated with the data information. It could be understood that the storage device identifier may be assigned by the management device according to relevant information, such as a resource utilization ratio, of current distributed storage in a process of storing the target data. The first authentication information may optionally be route information that is selected by the management device from an information pool for the target data and that uniquely matches the target data. The access device may send the first authentication information and the data information to the storage device corresponding to the storage device identifier.

S208: The storage device searches for the second authentication information associated with the data information, and matches the first authentication information with the second authentication information.

Optionally, the storage device may search for the associated second authentication information that is assigned by the management device for the target data in advance, and if the second authentication information is found, the storage device may match the first authentication information with the second authentication information.

S209: When the first authentication information matches and is consistent with the second authentication information, the storage device obtains the target data indicated by the data information, and sends the target data to the access device.

Optionally, only when the first authentication information matches and is consistent with the second authentication information, the storage device allows the access device to access the target data. The storage device obtains the target data indicated by the data information, and sends the target data to the access device.

When the second authentication information is not found or the first authentication information does not match and is inconsistent with the second authentication information, the storage device denies access of the access device to the target data. The storage device sends prompt information indicating a data obtaining failure and the like to the access device.

S210: The access device obtains the target data sent by the storage device, and sends the target data to the user terminal to respond to the data request.

S211: When the target data is removed from the storage device, the management device recycles the second authentication information, and deletes the second authentication information from the access device and the second authentication information from the storage device separately.

Optionally, when storage of the target data is canceled by the user terminal, that is, when the target data is removed from the storage device, the management device may recycle the second authentication information to the information pool for use in subsequent data storage, and delete the second authentication information from the access device and the second authentication information from the storage device separately.

The first authentication information and second authentication information used in this embodiment of this application may be same authentication information, and a naming manner using "first" and "second" is used for distinguishing authentication information separately obtained in two processes, namely, a data storing process and a data requesting process.

In this embodiment of this application, when obtaining the data request carrying the data information of the target data sent by the user terminal, the access device may obtain the storage device identifier associated with the data information and may obtain the preset first authentication information associated with the data information, the first authentication information and the data information are sent to the storage device corresponding to the storage device identifier, so that the storage device performs authentication on the first authentication information, and after the authentication succeeds, the target data indicated by the data information is returned to the access device, and finally, the access device sends the target data to the user terminal to respond to the data request. The first authentication information associated with the data information of the requested data is added, and the requested data can be obtained only after the authentication on the first authentication information succeeds, to avoid a case that erroneous data is obtained because the data is migrated or replaced with new other data, thereby ensuring accuracy and security of the requested data. The second authentication information is uniquely assigned to the target data in advance, so that during subsequent data requesting, the first authentication information is matched with the second authentication information, to further implement the data obtaining process, thereby effectively ensuring accuracy and security of the requested data. The used second authentication information is recycled, so that the authentication information is repeatedly used, thereby optimizing resource assignment in a distributed system and improving usability of the distributed system.

Figure 3:
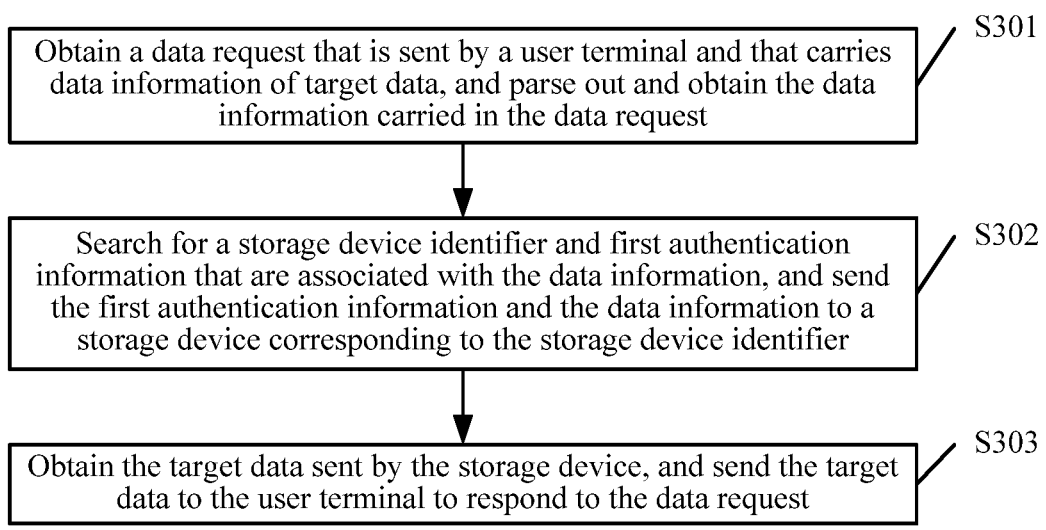
FIG. 3 is a schematic flowchart of another method for processing a data request according to an embodiment.

FIG. 3 is a schematic flowchart of another method for processing a data request according to an embodiment. As shown in FIG. 3, the method in this embodiment of this application is described from a perspective of an access device side. The method may include the following step S301 to step S303.

S301: Obtain a data request that is sent by a user terminal and that carries data information of target data, and parse out and obtain the data information carried in the data request.

Optionally, the user terminal may send the data request carrying the data information of the target data to a currently connected access device. The data information may optionally be data attributes, such as a data name and a data type, of the target data. The access device obtains the data request sent by the user terminal, and may parse the data request and obtain the data information carried in the data request.

S302: Search for a storage device identifier and first authentication information that are associated with the data information, and send the first authentication information and the data information to a storage device corresponding to the storage device identifier.

Optionally, the access device searches for the storage device identifier and first authentication information that are associated with the data information. It could be understood that the storage device identifier may be assigned by the management device according to relevant information, such as a resource utilization ratio, of current distributed storage in a process of storing the target data. The first authentication information may optionally be route information that is selected by the management device from an information pool for the target data and that uniquely matches the target data. The access device may send the first authentication information and the data information to the storage device corresponding to the storage device identifier. The storage device receives the data information and the first authentication information that are sent by the access device. Optionally, the storage device may first perform authentication on the first authentication information, and only after the authentication on the first authentication information succeeds, allows the access device to access the target data. The storage device obtains the target data indicated by the data information, and sends the target data to the access device. It could be understood that when the authentication on the first authentication information fails, the storage device denies access of the access device to the target data. The storage device sends prompt information indicating a data obtaining failure and the like to the access device.

S303: Obtain the target data sent by the storage device, and send the target data to the user terminal to respond to the data request.

In this embodiment of this application, when obtaining the data request carrying the data information of the target data sent by the user terminal, the access device may obtain the storage device identifier associated with the data information and may obtain the preset first authentication information associated with the data information, the first authentication information and the data information are sent to the storage device corresponding to the storage device identifier, so that the storage device performs authentication on the first authentication information, and after the authentication succeeds, the target data indicated by the data information is returned to the access device, and finally, the access device sends the target data to the user terminal to respond to the data request. The first authentication information associated with the data information of the requested data is added, and the requested data can be obtained only after the authentication on the first authentication information succeeds, to avoid a case that erroneous data is obtained because the data is migrated or replaced with new other data, thereby ensuring accuracy and security of the requested data.

Figure 4:
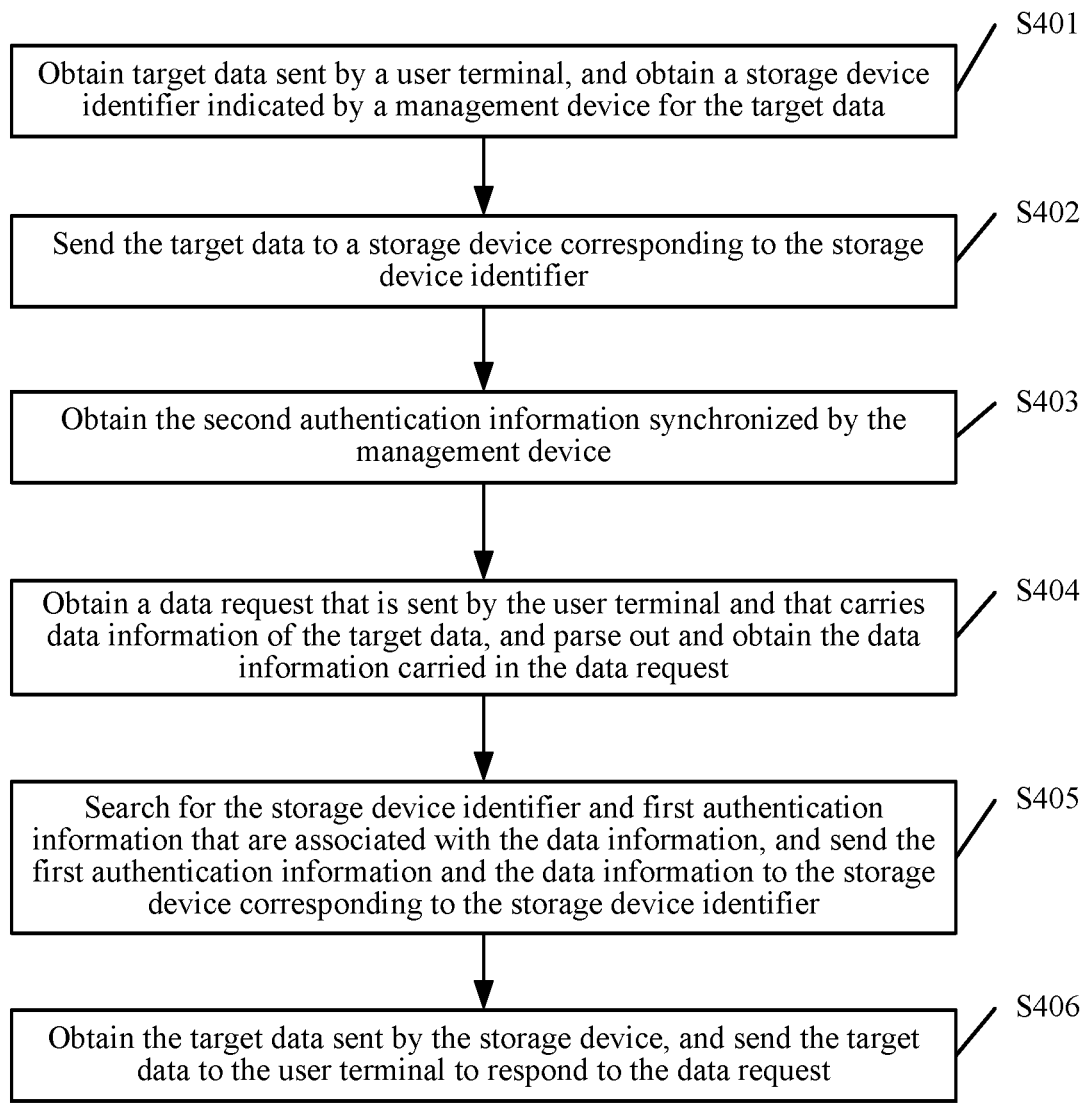
FIG. 4 is a schematic flowchart of still another method for processing a data request according to an embodiment.

FIG. 4 is a schematic flowchart of still another method for processing a data request according to an embodiment. As shown in FIG. 4, the method in this embodiment of this application is described from a perspective of an access device side. The method may include the following step S401 to step S406.

S401: Obtain target data sent by a user terminal, and obtain a storage device identifier indicated by a management device for the target data.

Optionally, the user terminal may store in advance the target data to a storage device by using the access device. Optionally, the user terminal may send target data that currently needs to be stored to a currently connected access device. The access device obtains the target data sent by the user terminal, and may request the management device for the storage device identifier corresponding to the storage device. The management device may indicate a storage device identifier for the target data according to relevant information, such as a resource utilization ratio, in current distributed storage and at the same time, update a data index. The access device obtains the storage device identifier indicated by the management device.

S402: Send the target data to a storage device corresponding to the storage device identifier.

S403: Obtain the second authentication information synchronized by the management device.

Optionally, the access device may send the target data to the storage device corresponding to the storage device identifier, and the storage device receives the target data sent by the access device and stores the target data.

After the storage device stores the target data, the management device may send second authentication information associated with the target data to the management device. The second authentication information may optionally be route information that uniquely matches the target data. The storage device obtains the second authentication information sent by the management device. The management device may alternatively synchronize the second authentication information to the access device, and the access device obtains the second authentication information synchronized by the management device.

S404: Obtain a data request that is sent by the user terminal and that carries data information of the target data, and parse out and obtain the data information carried in the data request.

Optionally, the user terminal may send the data request carrying the data information of the target data to a currently connected access device. The data information may optionally be data attributes, such as a data name and a data type, of the target data. The access device obtains the data request sent by the user terminal, and may parse the data request and obtain the data information carried in the data request.

S405: Search for the storage device identifier and first authentication information that are associated with the data information, and send the first authentication information and the data information to the storage device corresponding to the storage device identifier.

Optionally, the access device searches for the storage device identifier and first authentication information that are associated with the data information. It could be understood that the storage device identifier may be assigned by the management device according to relevant information, such as a resource utilization ratio, of current distributed storage in a process of storing the target data. The first authentication information may optionally be route information that is selected by the management device from an information pool for the target data and that uniquely matches the target data. The access device may send the first authentication information and the data information to the storage device corresponding to the storage device identifier.

The storage device may search for the associated second authentication information that is assigned by the management device for the target data in advance, and if the second authentication information is found, the storage device may match the first authentication information with the second authentication information. Only when the first authentication information matches and is consistent with the second authentication information, the storage device allows the access device to access the target data. The storage device obtains the target data indicated by the data information, and sends the target data to the access device. When the second authentication information is not found or the first authentication information does not match and is inconsistent with the second authentication information, the storage device denies access of the access device to the target data. The storage device sends prompt information indicating a data obtaining failure and the like to the access device.

S406: Obtain the target data sent by the storage device, and send the target data to the user terminal to respond to the data request.

In this embodiment of this application, when storage of the target data is canceled by the user terminal, that is, when the target data is removed from the storage device, the management device may recycle the second authentication information to the information pool for use in subsequent data storage, and delete the second authentication information from the access device and the second authentication information from the storage device separately.

The first authentication information and second authentication information used in this embodiment of this application may be same authentication information, and a naming manner using "first" and "second" is used for distinguishing authentication information separately obtained in two processes, namely, a data storing process and a data requesting process.

In this embodiment of this application, when obtaining the data request carrying the data information of the target data sent by the user terminal, the access device may obtain the storage device identifier associated with the data information and may obtain the preset first authentication information associated with the data information, the first authentication information and the data information are sent to the storage device corresponding to the storage device identifier, so that the storage device performs authentication on the first authentication information, and after the authentication succeeds, the target data indicated by the data information is returned to the access device, and finally, the access device sends the target data to the user terminal to respond to the data request. The first authentication information associated with the data information of the requested data is added, and the requested data can be obtained only after the authentication on the first authentication information succeeds, to avoid a case that erroneous data is obtained because the data is migrated or replaced with new other data, thereby ensuring accuracy and security of the requested data. The second authentication information is uniquely assigned to the target data in advance, so that during subsequent data requesting, the first authentication information is matched with the second authentication information, to further implement the data obtaining process, thereby effectively ensuring accuracy and security of the requested data. The used second authentication information is recycled, so that the authentication information is repeatedly used, thereby optimizing resource assignment in a distributed system and improving usability of the distributed system.

Figure 5:
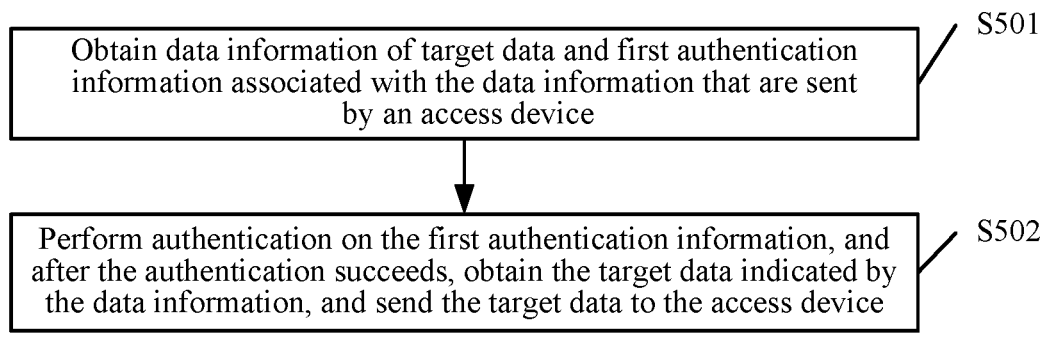
FIG. 5 is a schematic flowchart of still another method for processing a data request according to an embodiment.

FIG. 5 is a schematic flowchart of still another method for processing a data request according to an embodiment. As shown in FIG. 5, the method in this embodiment of this application is described from a perspective of a storage device side. The method may include the following step S501 to step S502.

S501: Obtain data information of target data and first authentication information associated with the data information that are sent by an access device.

Optionally, a user terminal may send a data request carrying the data information of the target data to a currently connected access device. The data information may optionally be data attributes, such as a data name and a data type, of the target data. The access device obtains the data request sent by the user terminal, and may parse the data request and obtain the data information carried in the data request. The access device searches for a storage device identifier and first authentication information that are associated with the data information. It could be understood that the storage device identifier may be assigned by a management device according to relevant information, such as a resource utilization ratio, of current distributed storage in a process of storing the target data. The first authentication information may optionally be route information that is selected by the management device from an information pool for the target data and that uniquely matches the target data. The access device may send the first authentication information and the data information to the storage device corresponding to the storage device identifier. The storage device receives the data information and the first authentication information that are sent by the access device.

S502: Perform authentication on the first authentication information, and after the authentication succeeds, obtain the target data indicated by the data information, and send the target data to the access device.

Optionally, the storage device may first perform authentication on the first authentication information, and only when the authentication on the first authentication information succeeds, allow the access device to access the target data. The storage device obtains the target data indicated by the data information, and sends the target data to the access device. The access device obtains the target data sent by the storage device, and sends the target data to the user terminal to respond to the data request.

It could be understood that when the authentication on the first authentication information fails, the storage device denies access of the access device to the target data. The storage device sends prompt information indicating a data obtaining failure and the like to the access device.

In this embodiment of this application, when obtaining the data request carrying the data information of the target data sent by the user terminal, the access device may obtain the storage device identifier associated with the data information and may obtain the preset first authentication information associated with the data information, the first authentication information and the data information are sent to the storage device corresponding to the storage device identifier, so that the storage device performs authentication on the first authentication information, and after the authentication succeeds, the target data indicated by the data information is returned to the access device, and finally, the access device sends the target data to the user terminal to respond to the data request. The first authentication information associated with the data information of the requested data is added, and the requested data can be obtained only after the authentication on the first authentication information succeeds, to avoid a case that erroneous data is obtained because the data is migrated or replaced with new other data, thereby ensuring accuracy and security of the requested data.

Figure 6:
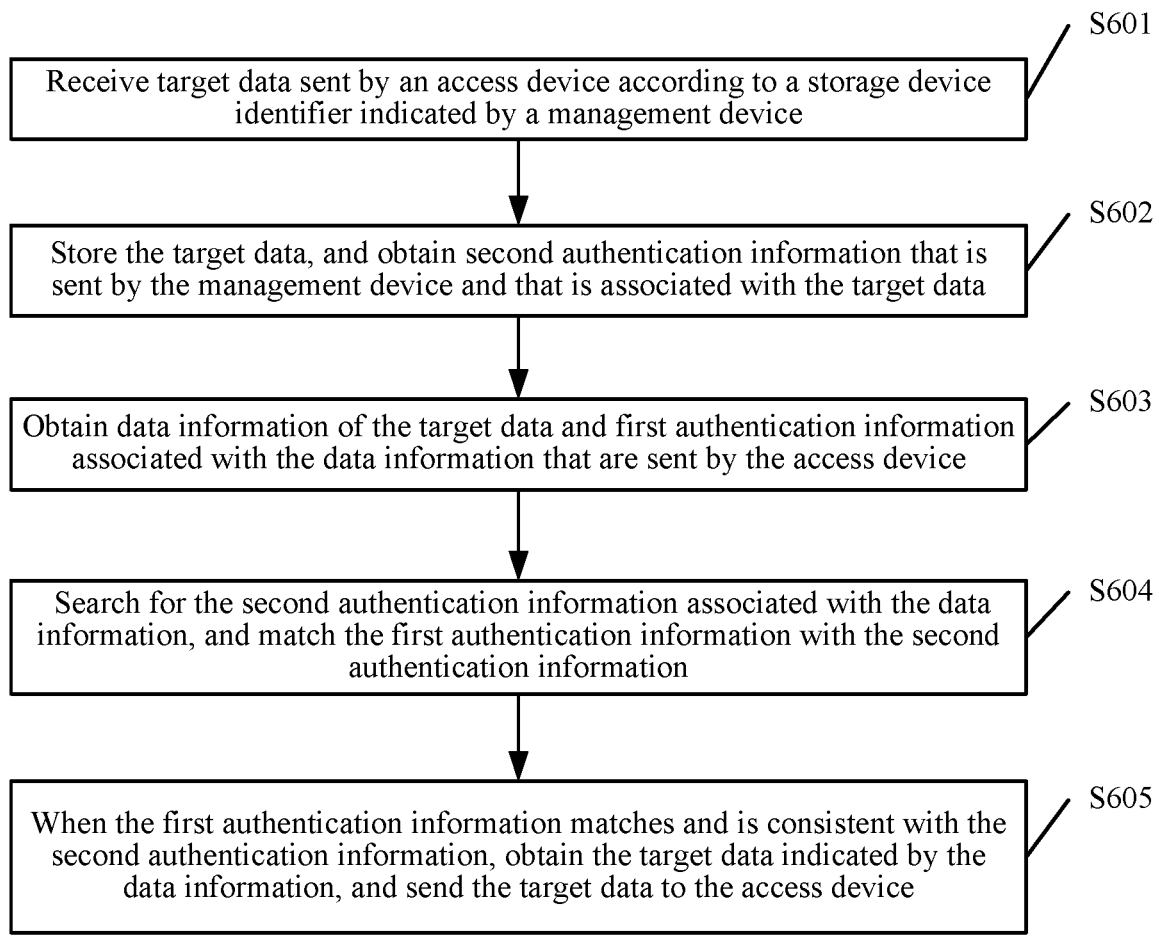
FIG. 6 is a schematic flowchart of still another method for processing a data request according to an embodiment.

FIG. 6 is a schematic flowchart of still another method for processing a data request according to an embodiment. As shown in FIG. 6, the method in this embodiment of this application is described from a perspective of a storage device side. The method may include the following step S601 to step S605.

S601: Receive target data sent by an access device according to a storage device identifier indicated by a management device.

Optionally, a user terminal may store in advance the target data to a storage device by using the access device. Optionally, the user terminal may send target data that currently needs to be stored to a currently connected access device.

The access device obtains the target data sent by the user terminal, and may request the management device for the storage device identifier corresponding to the storage device. The management device may indicate a storage device identifier for the target data according to relevant information, such as a resource utilization ratio, in current distributed storage and at the same time, update a data index. The access device obtains the storage device identifier indicated by the management device. The access device may send the target data to the storage device corresponding to the storage device identifier, and the storage device receives the target data sent by the access device.

S602: Store the target data, and obtain second authentication information that is sent by the management device and that is associated with the target data.

Optionally, the storage device stores the target data, and after storing the target data, sends the second authentication information associated with the target data to the management device. The second authentication information may optionally be route information that uniquely matches the target data. The storage device obtains the second authentication information sent by the management device. The management device may alternatively synchronize the second authentication information to the access device, and the access device obtains the second authentication information synchronized by the management device.

S603: Obtain data information of the target data and first authentication information associated with the data information that are sent by the access device.

Optionally, a user terminal may send a data request carrying the data information of the target data to a currently connected access device. The data information may optionally be data attributes, such as a data name and a data type, of the target data. The access device obtains the data request sent by the user terminal, and may parse the data request and obtain the data information carried in the data request. The access device searches for a storage device identifier and first authentication information that are associated with the data information. It could be understood that the storage device identifier may be assigned by a management device according to relevant information, such as a resource utilization ratio, of current distributed storage in a process of storing the target data. The first authentication information may optionally be route information that is selected by the management device from an information pool for the target data and that uniquely matches the target data. The access device may send the first authentication information and the data information to the storage device corresponding to the storage device identifier. The storage device receives the data information and the first authentication information that are sent by the access device.

S604: Search for the second authentication information associated with the data information, and match the first authentication information with the second authentication information.

Optionally, the storage device may search for the associated second authentication information that is assigned by the management device for the target data in advance, and if the second authentication information is found, the storage device may match the first authentication information with the second authentication information.

S605: When the first authentication information matches and is consistent with the second authentication information, obtain the target data indicated by the data information, and send the target data to the access device.

Optionally, only when the first authentication information matches and is consistent with the second authentication information, the storage device allows the access device to access the target data. The storage device obtains the target data indicated by the data information, and sends the target data to the access device. The access device obtains the target data sent by the storage device, and sends the target data to the user terminal to respond to the data request.

When the second authentication information is not found or the first authentication information does not match and is inconsistent with the second authentication information, the storage device denies access of the access device to the target data. The storage device sends prompt information indicating a data obtaining failure and the like to the access device.

In this embodiment of this application, when storage of the target data is canceled by the user terminal, that is, when the target data is removed from the storage device, the management device may recycle the second authentication information to the information pool for use in subsequent data storage, and delete the second authentication information from the access device and the second authentication information from the storage device separately.

The first authentication information and second authentication information used in this embodiment of this application may be same authentication information, and a naming manner using "first" and "second" is used for distinguishing authentication information separately obtained in two processes, namely, a data storing process and a data requesting process.

In this embodiment of this application, when obtaining the data request carrying the data information of the target data sent by the user terminal, the access device may obtain the storage device identifier associated with the data information and may obtain the preset first authentication information associated with the data information, the first authentication information and the data information are sent to the storage device corresponding to the storage device identifier, so that the storage device performs authentication on the first authentication information, and after the authentication succeeds, the target data indicated by the data information is returned to the access device, and finally, the access device sends the target data to the user terminal to respond to the data request. The first authentication information associated with the data information of the requested data is added, and the requested data can be obtained only after the authentication on the first authentication information succeeds, to avoid a case that erroneous data is obtained because the data is migrated or replaced with new other data, thereby ensuring accuracy and security of the requested data. The second authentication information is uniquely assigned to the target data in advance, so that during subsequent data requesting, the first authentication information is matched with the second authentication information, to further implement the data obtaining process, thereby effectively ensuring accuracy and security of the requested data. The used second authentication information is recycled, so that the authentication information is repeatedly used, thereby optimizing resource assignment in a distributed system and improving usability of the distributed system.

Figure 7:
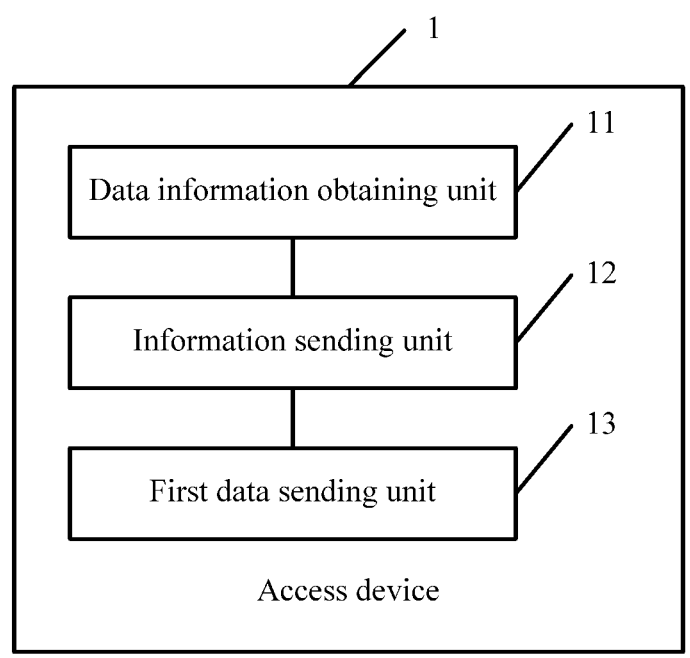
FIG. 7 is a schematic structural diagram of an access device according to an embodiment.
Figure 8:
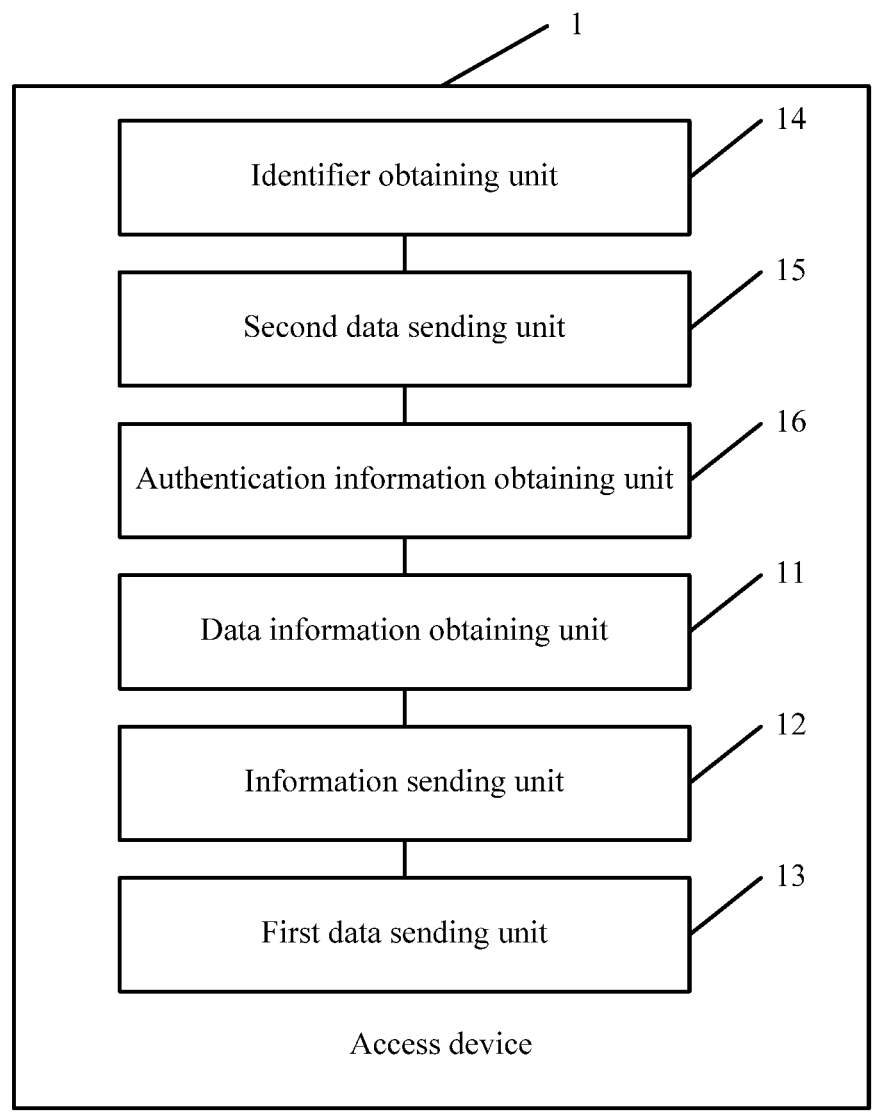
FIG. 8 is a schematic structural diagram of the access device according to another embodiment.

The following describes the access device according to the embodiments of this application in detail with reference to FIG. 7 to FIG. 8. The access device shown in FIG. 7 and FIG. 8 is configured to perform the methods in the embodiments shown in FIG. 3 and FIG. 4 of this application. For ease of description, only a part related to the embodiments of this application is shown. For technical details that are not disclosed, refer to the embodiments shown in FIG. 3 and FIG. 4 of this application.

FIG. 7 is a schematic structural diagram of an access device 1 according to an embodiment. As shown in FIG. 7, the access device 1 in this embodiment of this application may include a data information obtaining unit 11, an information sending unit 12, and a first data sending unit 13.

The data information obtaining unit 11 is configured to obtain a data request that is sent by a user terminal and that carries data information of target data, and parse out and obtain the data information carried in the data request.

In some embodiments, a user terminal may send a data request carrying the data information of the target data to a currently connected access device 1. The data information may optionally be data attributes, such as a data name and a data type, of the target data. The data information obtaining unit 11 obtains the data request sent by the user terminal, and may parse the data request and obtain the data information carried in the data request.

The information sending unit 12 is configured to search for a storage device identifier and first authentication information that are associated with the data information, and send the first authentication information and the data information to a storage device corresponding to the storage device identifier.

In some embodiments, the information sending unit 12 searches for a storage device identifier and first authentication information that are associated with the data information. It could be understood that the storage device identifier may be assigned by a management device according to relevant information, such as a resource utilization ratio, of current distributed storage in a process of storing the target data. The first authentication information may optionally be route information that is selected by the management device from an information pool for the target data and that uniquely matches the target data. The information sending unit 12 may send the first authentication information and the data information to the storage device corresponding to the storage device identifier.

The storage device receives the data information and the first authentication information that are sent by the access device 1. Optionally, the storage device may first perform authentication on the first authentication information, and only after the authentication on the first authentication information succeeds, allows the access device 1 to access the target data. The storage device obtains the target data indicated by the data information, and sends the target data to the access device 1. It could be understood that when the authentication on the first authentication information fails, the storage device denies access of the access device 1 to the target data. The storage device sends prompt information indicating a data obtaining failure and the like to the access device 1.

The first data sending unit 13 is configured to obtain the target data sent by the storage device, and send the target data to the user terminal to respond to the data request.

In this embodiment of this application, when obtaining the data request carrying the data information of the target data sent by the user terminal, the access device may obtain the storage device identifier associated with the data information and may obtain the preset first authentication information associated with the data information, the first authentication information and the data information are sent to the storage device corresponding to the storage device identifier, so that the storage device performs authentication on the first authentication information, and after the authentication succeeds, the target data indicated by the data information is returned to the access device, and finally, the access device sends the target data to the user terminal to respond to the data request. The first authentication information associated with the data information of the requested data is added, and the requested data can be obtained only after the authentication on the first authentication information succeeds, to avoid a case that erroneous data is obtained because the data is migrated or replaced with new other data, thereby ensuring accuracy and security of the requested data.

FIG. 8 is a schematic structural diagram of the access device 1 according to another embodiment. As shown in FIG. 8, the access device 1 in this embodiment of this application may include the data information obtaining unit 11, the information sending unit 12, the first data sending unit 13, an identifier obtaining unit 14, a second data sending unit 15, and an authentication information obtaining unit 16.

The identifier obtaining unit 14 is configured to obtain the target data sent by the user terminal, and obtain a storage device identifier indicated by a management device for the target data.

In some embodiments, a user terminal may store in advance the target data to a storage device by using the access device 1. Optionally, the user terminal may send target data that currently needs to be stored to a currently connected access device 1. The identifier obtaining unit 14 obtains the target data sent by the user terminal, and may request the management device for the storage device identifier corresponding to the storage device. The management device may indicate a storage device identifier for the target data according to relevant information, such as a resource utilization ratio, in current distributed storage and at the same time, update a data index. The identifier obtaining unit 14 obtains the storage device identifier indicated by the management device.

The second data sending unit 15 is configured to send end the target data to a storage device corresponding to the storage device identifier.

The authentication information obtaining unit 16 is configured to obtain the second authentication information synchronized by the management device.

In some embodiments, the second data sending unit 15 may send the target data to the storage device corresponding to the storage device identifier, and the storage device receives the target data sent by the access device 1 and stores the target data.

After the storage device stores the target data, the management device may send second authentication information associated with the target data to the management device. The second authentication information may optionally be route information that uniquely matches the target data. The storage device obtains the second authentication information sent by the management device. The management device may alternatively synchronize the second authentication information to the access device 1, and the authentication information obtaining unit 16 obtains the second authentication information synchronized by the management device.

The data information obtaining unit 11 is configured to obtain a data request that is sent by a user terminal and that carries data information of target data, and parse out and obtain the data information carried in the data request.

In some embodiments, a user terminal may send a data request carrying the data information of the target data to a currently connected access device 1. The data information may optionally be data attributes, such as a data name and a data type, of the target data. The data information obtaining unit 11 obtains the data request sent by the user terminal, and may parse the data request and obtain the data information carried in the data request.

The information sending unit 12 is configured to search for a storage device identifier and first authentication information that are associated with the data information, and send the first authentication information and the data information to a storage device corresponding to the storage device identifier.

In some embodiments, the information sending unit 12 searches for a storage device identifier and first authentication information that are associated with the data information. It could be understood that the storage device identifier may be assigned by a management device according to relevant information, such as a resource utilization ratio, of current distributed storage in a process of storing the target data. The first authentication information may optionally be route information that is selected by the management device from an information pool for the target data and that uniquely matches the target data. The information sending unit 12 may send the first authentication information and the data information to the storage device corresponding to the storage device identifier.

The storage device may search for the associated second authentication information that is assigned by the management device for the target data in advance, and if the second authentication information is found, the storage device may match the first authentication information with the second authentication information. Only when the first authentication information matches and is consistent with the second authentication information, the storage device allows the access device 1 to access the target data. The storage device obtains the target data indicated by the data information, and sends the target data to the access device 1. When the second authentication information is not found or the first authentication information does not match and is inconsistent with the second authentication information, the storage device denies access of the access device 1 to the target data. The storage device sends prompt information indicating a data obtaining failure and the like to the access device 1.

The first data sending unit 13 is configured to obtain the target data sent by the storage device, and send the target data to the user terminal to respond to the data request.

In this embodiment of this application, when storage of the target data is canceled by the user terminal, that is, when the target data is removed from the storage device, the management device may recycle the second authentication information to the information pool for use in subsequent data storage, and delete the second authentication information from the access device 1 and the second authentication information from the storage device separately.

The first authentication information and second authentication information used in this embodiment of this application may be same authentication information, and a naming manner using "first" and "second" is used for distinguishing authentication information separately obtained in two processes, namely, a data storing process and a data requesting process.

In this embodiment of this application, when obtaining the data request carrying the data information of the target data sent by the user terminal, the access device may obtain the storage device identifier associated with the data information and may obtain the preset first authentication information associated with the data information, the first authentication information and the data information are sent to the storage device corresponding to the storage device identifier, so that the storage device performs authentication on the first authentication information, and after the authentication succeeds, the target data indicated by the data information is returned to the access device, and finally, the access device sends the target data to the user terminal to respond to the data request. The first authentication information associated with the data information of the requested data is added, and the requested data can be obtained only after the authentication on the first authentication information succeeds, to avoid a case that erroneous data is obtained because the data is migrated or replaced with new other data, thereby ensuring accuracy and security of the requested data. The second authentication information is uniquely assigned to the target data in advance, so that during subsequent data requesting, the first authentication information is matched with the second authentication information, to further implement the data obtaining process, thereby effectively ensuring accuracy and security of the requested data. The used second authentication information is recycled, so that the authentication information is repeatedly used, thereby optimizing resource assignment in a distributed system and improving usability of the distributed system.

Figure 9:
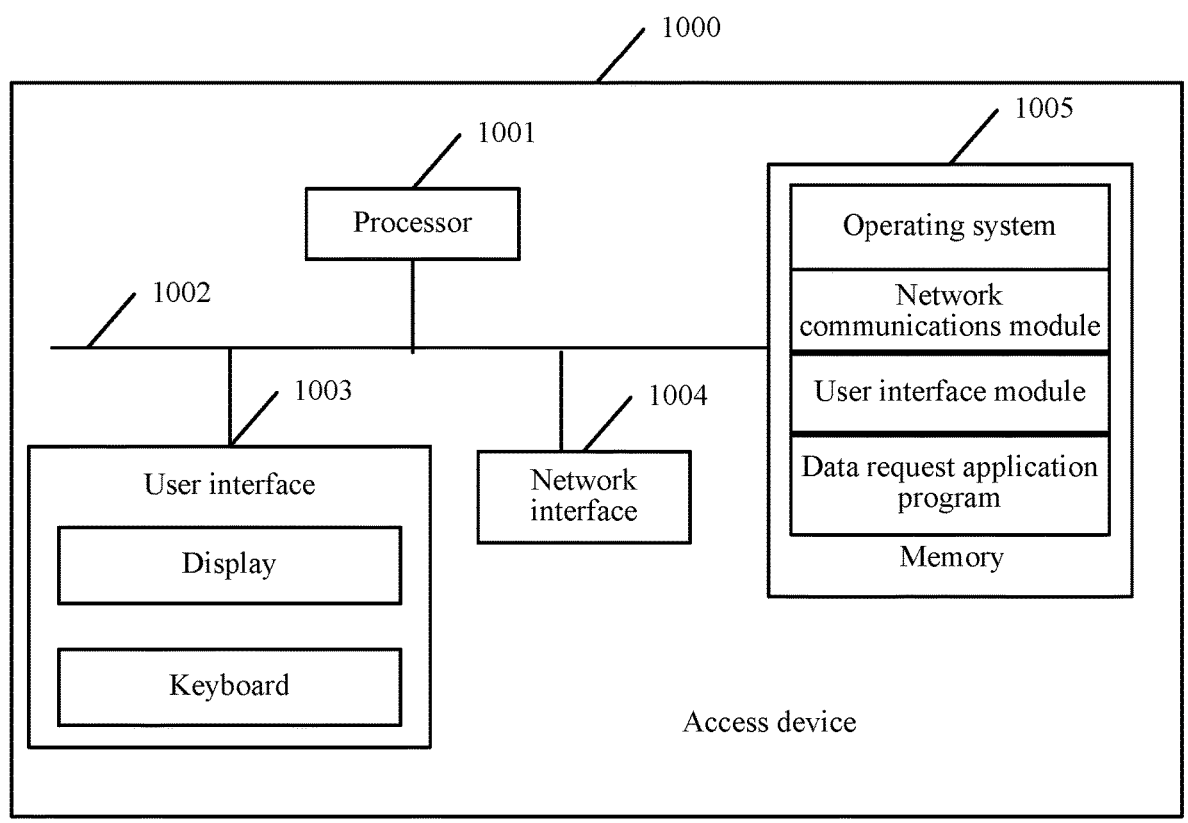
FIG. 9 is a schematic structural diagram of an access device according to another embodiment.

FIG. 9 is a schematic structural diagram of an access device 1000 according to another embodiment. As shown in FIG. 9, the access device 1000 may include at least one processor 1001 such as a CPU, at least one network interface 1004, a user interface 1003, a memory 1005, and at least one communications bus 1002. The communications bus 1002 is configured to implement connection and communication between the components. The user interface 1003 may include a display 10031, a keyboard 10032, and optionally, the user interface 1003 may further include a standard wired interface and a standard wireless interface. Optionally, the network interface 1004 may include a standard wired interface and a standard wireless interface (such as a WiFi interface). The memory 1005 may be a high-speed RAM memory, or may be a non-volatile memory, for example, at least one magnetic disk memory. Optionally, the memory 1005 may further be at least one storage apparatus that is located far away from the processor 1001. As shown in FIG. 9, the memory 1005, which is used as a computer storage medium, may include an operating system 10051, a network communications module 10052, a user interface module 10053, and a data request application program 10054.

In the access device 1000 shown in FIG. 9, the user interface 1003 is mainly configured to: provide an input interface for a user, and obtain data entered by the user. The network interface 1004 is mainly configured to perform data communication with a user terminal, a storage device, and a management device. The processor 1001 may be configured to invoke the data request application program stored in the memory 1005 and perform the following operations:

obtaining a data request that is sent by a user terminal and that carries data information of target data, and parsing out and obtaining the data information carried in the data request;

searching for a storage device identifier and first authentication information that are associated with the data information, sending the first authentication information and the data information to a storage device corresponding to the storage device identifier, to enable the storage device to perform authentication on the first authentication information, and after the authentication succeeds, obtaining the target data indicated by the data information, and sending the target data to the access device; and obtaining the target data sent by the storage device, and sending the target data to the user terminal to respond to the data request.

In an embodiment, before the obtaining a data request that is sent by a user terminal and that carries data information of target data, the processor 1001 further perform the following operations:

obtaining the target data sent by the user terminal, and obtaining a storage device identifier indicated by a management device for the target data;

sending the target data to the storage device corresponding to the storage device identifier, to enable the storage device to store the target data and enable the storage device to obtain second authentication information that is sent by the management device and that is associated with the target data; and obtaining the second authentication information synchronized by the management device.

In this embodiment of this application, when obtaining the data request carrying the data information of the target data sent by the user terminal, the access device may obtain the storage device identifier associated with the data information and may obtain the preset first authentication information associated with the data information, the first authentication information and the data information are sent to the storage device corresponding to the storage device identifier, so that the storage device performs authentication on the first authentication information, and after the authentication succeeds, the target data indicated by the data information is returned to the access device, and finally, the access device sends the target data to the user terminal to respond to the data request. The first authentication information associated with the data information of the requested data is added, and the requested data can be obtained only after the authentication on the first authentication information succeeds, to avoid a case that erroneous data is obtained because the data is migrated or replaced with new other data, thereby ensuring accuracy and security of the requested data. The second authentication information is uniquely assigned to the target data in advance, so that during subsequent data requesting, the first authentication information is matched with the second authentication information, to further implement the data obtaining process, thereby effectively ensuring accuracy and security of the requested data.

Figure 10:
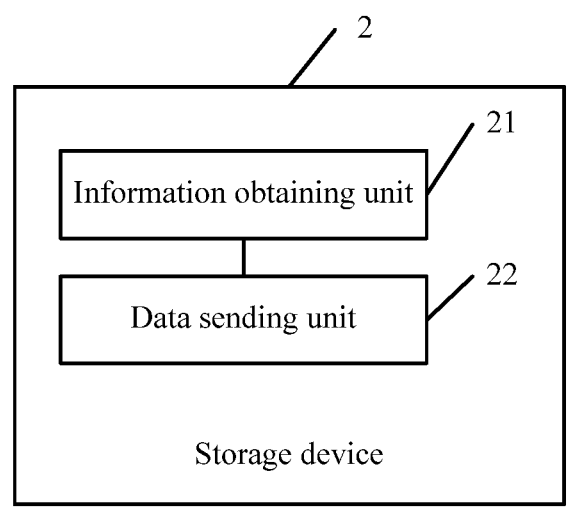
FIG. 10 is a schematic structural diagram of a storage device according to an embodiment.
Figure 11:
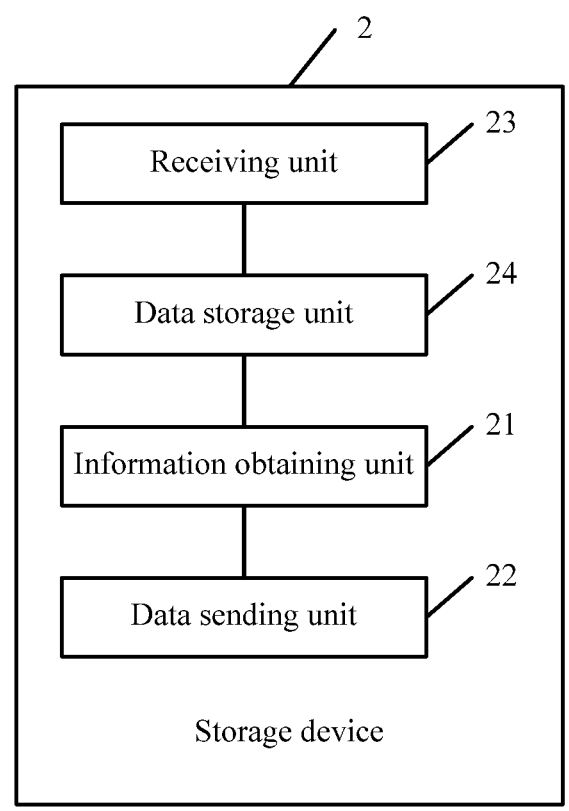
FIG. 11 is a schematic structural diagram of the storage device according to another embodiment.
Figure 12:
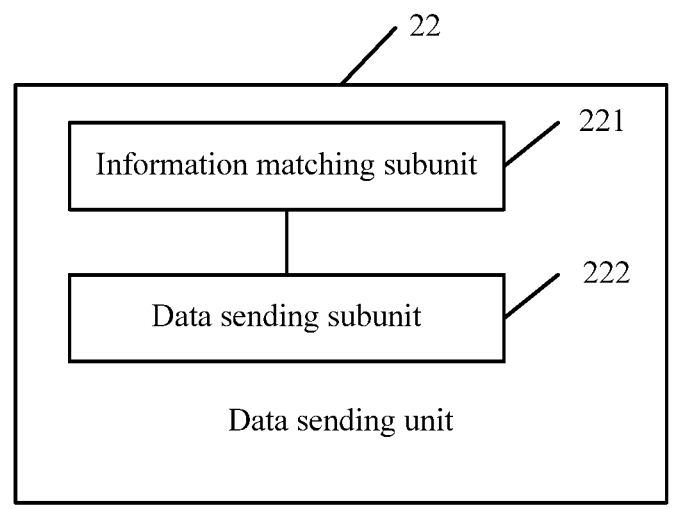
FIG. 12 is a schematic structural diagram of a data sending unit according to an embodiment.

The following describes the storage device according to the embodiments of this application in detail with reference to FIG. 10 to FIG. 12. The storage device shown in FIG. 10 to FIG. 12 is configured to perform the methods in the embodiments shown in FIG. 5 and FIG. 6 of this application. For ease of description, only a part related to the embodiments of this application is shown. For technical details that are not disclosed, refer to the embodiments shown in FIG. 5 and FIG. 6 of this application.

FIG. 10 is a schematic structural diagram of a storage device 2 according to an embodiment. As shown in FIG. 10, the storage device 2 in this embodiment of this application may include an information obtaining unit 21 and a data sending unit 22.

The information obtaining unit 21 is configured to obtain data information of target data and first authentication information associated with the data information that are sent by an access device.

In some embodiments, a user terminal may send a data request carrying the data information of the target data to a currently connected access device. The data information may optionally be data attributes, such as a data name and a data type, of the target data. The access device obtains the data request sent by the user terminal, and may parse the data request and obtain the data information carried in the data request. The access device searches for a storage device identifier and first authentication information that are associated with the data information. It could be understood that the storage device identifier may be assigned by a management device according to relevant information, such as a resource utilization ratio, of current distributed storage in a process of storing the target data. The first authentication information may optionally be route information that is selected by the management device from an information pool for the target data and that uniquely matches the target data. The access device may send the first authentication information and the data information to the storage device 2 corresponding to the storage device identifier. The information obtaining unit 21 receives the data information and the first authentication information that are sent by the access device.

The data sending unit 22 is configured to perform authentication on the first authentication information, and after the authentication succeeds, obtain the target data indicated by the data information, and send the target data to the access device.

In some embodiments, the data sending unit 22 may first perform authentication on the first authentication information, and only when the authentication on the first authentication information succeeds, allow the access device to access the target data. The data sending unit 22 obtains the target data indicated by the data information, and sends the target data to the access device. The access device obtains the target data sent by the storage device 2, and sends the target data to the user terminal to respond to the data request.

It could be understood that when the authentication on the first authentication information fails, the data sending unit 22 denies access of the access device to the target data. The data sending unit 22 sends prompt information indicating a data obtaining failure and the like to the access device.

In this embodiment of this application, when obtaining the data request carrying the data information of the target data sent by the user terminal, the access device may obtain the storage device identifier associated with the data information and may obtain the preset first authentication information associated with the data information, the first authentication information and the data information are sent to the storage device corresponding to the storage device identifier, so that the storage device performs authentication on the first authentication information, and after the authentication succeeds, the target data indicated by the data information is returned to the access device, and finally, the access device sends the target data to the user terminal to respond to the data request. The first authentication information associated with the data information of the requested data is added, and the requested data can be obtained only after the authentication on the first authentication information succeeds, to avoid a case that erroneous data is obtained because the data is migrated or replaced with new other data, thereby ensuring accuracy and security of the requested data.

FIG. 11 is a schematic structural diagram of the storage device 2 according to another embodiment. As shown in FIG. 11, the storage device 2 in this embodiment of this application may include an information obtaining unit 21, a data sending unit 22, a data receiving unit 23, and a data storage unit 24.

The data receiving unit 23 is configured to receive target data sent by an access device according to a storage device identifier indicated by a management device.

In some embodiments, a user terminal may store in advance the target data to the storage device 2 by using an access device. Optionally, the user terminal may send target data that currently needs to be stored to a currently connected access device. The access device obtains the target data sent by the user terminal, and may request the management device for the storage device identifier corresponding to the storage device 2. The management device may indicate a storage device identifier for the target data according to relevant information, such as a resource utilization ratio, in current distributed storage and at the same time, update a data index. The access device obtains the storage device identifier indicated by the management device. The access device may send the target data to the storage device 2 corresponding to the storage device identifier, and the data receiving unit 23 receives the target data sent by the access device.

The data storage unit 24 is configured to store the target data, and obtain second authentication information that is sent by the management device and that is associated with the target data.

In some embodiments, the data storage unit 24 stores the target data, and after storing the target data, sends second authentication information associated with the target data to the management device. The second authentication information may optionally be route information that uniquely matches the target data. The data storage unit 24 obtains the second authentication information sent by the management device.

The management device may alternatively synchronize the second authentication information to the access device, and the access device obtains the second authentication information synchronized by the management device.

The information obtaining unit 21 is configured to obtain data information of target data and first authentication information associated with the data information that are sent by an access device.

In some embodiments, a user terminal may send a data request carrying the data information of the target data to a currently connected access device. The data information may optionally be data attributes, such as a data name and a data type, of the target data. The access device obtains the data request sent by the user terminal, and may parse the data request and obtain the data information carried in the data request. The access device searches for a storage device identifier and first authentication information that are associated with the data information. It could be understood that the storage device identifier may be assigned by a management device according to relevant information, such as a resource utilization ratio, of current distributed storage in a process of storing the target data. The first authentication information may optionally be route information that is selected by the management device from an information pool for the target data and that uniquely matches the target data. The access device may send the first authentication information and the data information to the storage device 2 corresponding to the storage device identifier. The information obtaining unit 21 receives the data information and the first authentication information that are sent by the access device.

The data sending unit 22 is configured to perform authentication on the first authentication information, and after the authentication succeeds, obtain the target data indicated by the data information, and send the target data to the access device.

In some embodiments, the data sending unit 22 may first perform authentication on the first authentication information, and only when the authentication on the first authentication information succeeds, allow the access device to access the target data. The data sending unit 22 obtains the target data indicated by the data information, and sends the target data to the access device. The access device obtains the target data sent by the storage device 2, and sends the target data to the user terminal to respond to the data request.

It could be understood that when the authentication on the first authentication information fails, the data sending unit 22 denies access of the access device to the target data. The data sending unit 22 sends prompt information indicating a data obtaining failure and the like to the access device.

FIG. 12 is a schematic structural diagram of the data sending unit 22 according to an embodiment. As shown in FIG. 12, the data sending module 22 may include an information matching subunit 221 and a data sending subunit 222.

The information matching subunit 221 is configured to search for the second authentication information associated with the data information, and match the first authentication information with the second authentication information, i.e., determine whether the first authentication information matches with the second authentication information.

In some embodiments, the information matching subunit 221 may search for the associated second authentication information that is assigned by the management device for the target data in advance, and if the second authentication information is found, the information matching subunit 221 may match the first authentication information with the second authentication information.

The data sending subunit 222 is configured to when the first authentication information matches and is consistent with the second authentication information, obtain the target data indicated by the data information, and send the target data to the access device.

In some embodiments, only when the first authentication information matches and is consistent with the second authentication information, the data sending subunit 222 allows the access device to access the target data. The data sending subunit 222 obtains the target data indicated by the data information, and sends the target data to the access device. The access device obtains the target data sent by the storage device 2, and sends the target data to the user terminal to respond to the data request.

When the second authentication information is not found or the first authentication information does not match and is inconsistent with the second authentication information, the data sending subunit 222 denies access of the access device to the target data. The data sending subunit 222 sends prompt information indicating a data obtaining failure and the like to the access device.

In this embodiment of this application, when storage of the target data is canceled by the user terminal, that is, when the target data is removed from the storage device 2, the management device may recycle the second authentication information to the information pool for use in subsequent data storage, and delete the second authentication information from the access device and the second authentication information from the storage device 2 separately.

The first authentication information and second authentication information used in this embodiment of this application may be same authentication information, and a naming manner using "first" and "second" is used for distinguishing authentication information separately obtained in two processes, namely, a data storing process and a data requesting process.

In this embodiment of this application, when obtaining the data request carrying the data information of the target data sent by the user terminal, the access device may obtain the storage device identifier associated with the data information and may obtain the preset first authentication information associated with the data information, the first authentication information and the data information are sent to the storage device corresponding to the storage device identifier, so that the storage device performs authentication on the first authentication information, and after the authentication succeeds, the target data indicated by the data information is returned to the access device, and finally, the access device sends the target data to the user terminal to respond to the data request. The first authentication information associated with the data information of the requested data is added, and the requested data can be obtained only after the authentication on the first authentication information succeeds, to avoid a case that erroneous data is obtained because the data is migrated or replaced with new other data, thereby ensuring accuracy and security of the requested data. The second authentication information is uniquely assigned to the target data in advance, so that during subsequent data requesting, the first authentication information is matched with the second authentication information, to further implement the data obtaining process, thereby effectively ensuring accuracy and security of the requested data. The used second authentication information is recycled, so that the authentication information is repeatedly used, thereby optimizing resource assignment in a distributed system and improving usability of the distributed system.

Figure 13:
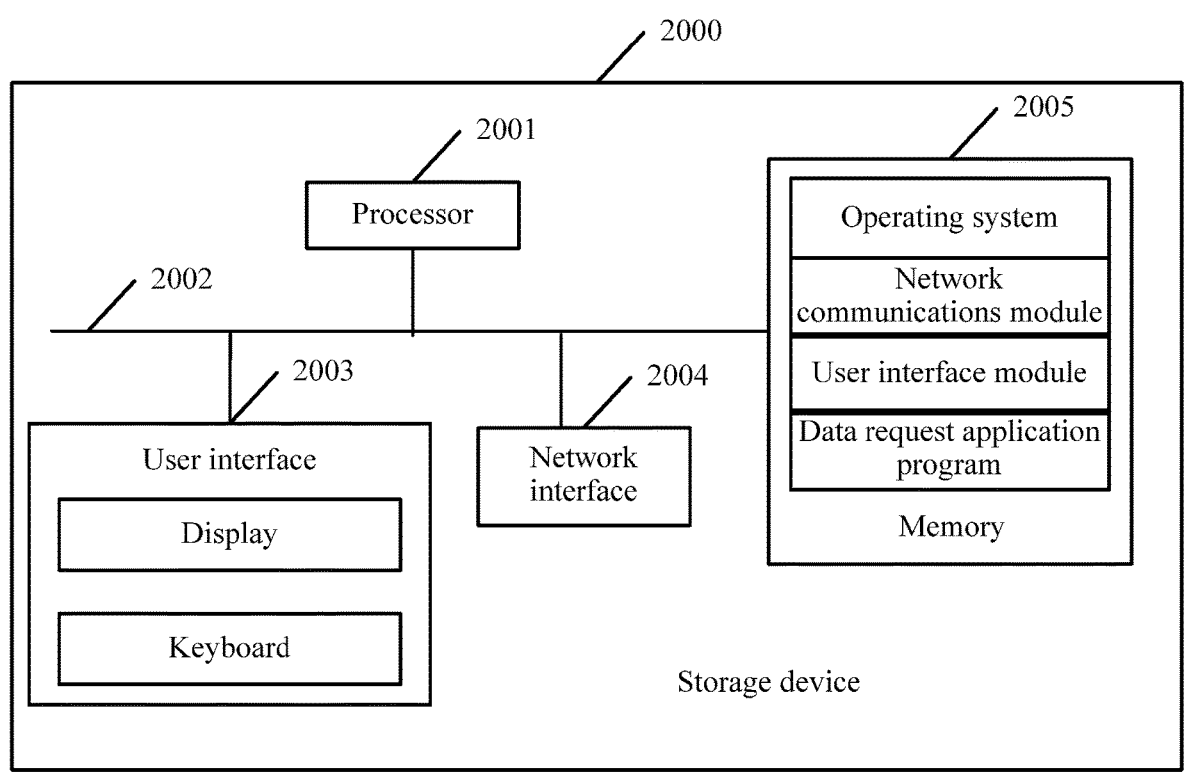
FIG. 13 is a schematic structural diagram of a storage device according to another embodiment.

FIG. 13 is a schematic structural diagram of a storage device 2000 according to another embodiment. As shown in FIG. 13, the storage device 2000 may include at least one processor 2001 such as a CPU, at least one network interface 2004, a user interface 2003, a memory 2005, and at least one communications bus 2002. The communications bus 2002 is configured to implement connection and communication between the components. The user interface 2003 may include a display 20031, a keyboard 20032, and optionally, the user interface 2003 may further include a standard wired interface and a standard wireless interface. Optionally, the network interface 2004 may include a standard wired interface and a standard wireless interface (such as a WiFi interface). The memory 2005 may be a high-speed RAM memory, or may be a non-volatile memory, for example, at least one magnetic disk memory. Optionally, the memory 2005 may further be at least one storage apparatus that is located far away from the processor 2001. As shown in FIG. 13, the memory 2005, which is used as a computer storage medium, may include an operating system 20051, a network communications module 20052, a user interface module 20053, and a data request application program 20054.

In the storage device 2000 shown in FIG. 13, the user interface 2003 is mainly configured to: provide an input interface for a user, and obtain data entered by the user. The network interface 2004 is mainly configured to perform data communication with an access device and a management device. The processor 2001 may be configured to invoke the data request application program stored in the memory 2005 and perform the following operations:

obtaining data information of target data sent by an access device and first authentication information associated with the data information, the data information being information obtained by the access device by parsing a data request sent by a user terminal, and the first authentication information being associated information searched for by the access device according to the data information; and performing authentication on the first authentication information, and after the authentication succeeds, obtaining the target data indicated by the data information, and sending the target data to the access device, to enable the access device to obtain the target data sent by the storage device and enable the access device to send the target data to the user terminal to respond to the data request.

In an embodiment, before the obtaining data information of target data and first authentication information associated with the data information that are sent by an access device, the processor 1001 further performs the following operations:

receiving the target data sent by the access device according to a storage device identifier indicated by a management device, the target data being data sent by the user terminal to the access device; and storing the target data, and obtaining second authentication information that is sent by the management device and that is associated with the target data.

In an embodiment, when performing authentication on the first authentication information, and after the authentication succeeds, obtaining the target data indicated by the data information, and sending the target data to the access device, the processor 1001 performs the following operations:

searching for the second authentication information associated with the data information, and matching the first authentication information with the second authentication information; and when the first authentication information matches and is consistent with the second authentication information, obtaining the target data indicated by the data information, and sending the target data to the access device.

In this embodiment of this application, when obtaining the data request carrying the data information of the target data sent by the user terminal, the access device may obtain the storage device identifier associated with the data information and may obtain the preset first authentication information associated with the data information, the first authentication information and the data information are sent to the storage device corresponding to the storage device identifier, so that the storage device performs authentication on the first authentication information, and after the authentication succeeds, the target data indicated by the data information is returned to the access device, and finally, the access device sends the target data to the user terminal to respond to the data request. The first authentication information associated with the data information of the requested data is added, and the requested data can be obtained only after the authentication on the first authentication information succeeds, to avoid a case that erroneous data is obtained because the data is migrated or replaced with new other data, thereby ensuring accuracy and security of the requested data. The second authentication information is uniquely assigned to the target data in advance, so that during subsequent data requesting, the first authentication information is matched with the second authentication information, to further implement the data obtaining process, thereby effectively ensuring accuracy and security of the requested data.

Figure 14:
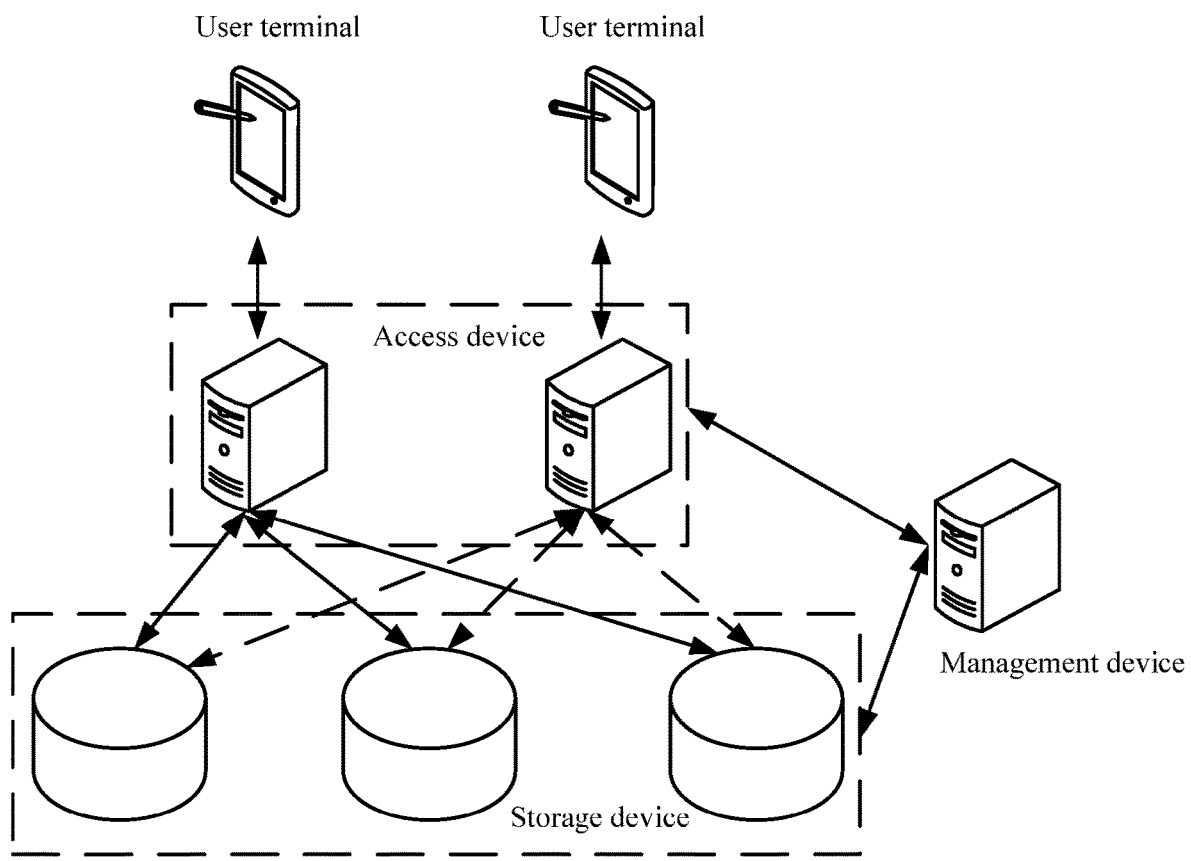
FIG. 14 is a schematic structural diagram of a system for processing a data request according to an embodiment.

FIG. 14 is a schematic structural diagram of a system for processing a data request according to an embodiment. As shown in FIG. 14, the system may include at least one user terminal 1401, an access device 1402, and a storage device 1403. The user terminal 1401 and the access device 1402 can be connected to each other through a network and the access device 1402 and the storage device 1403 can be connected to each other through a network. The access device 1402 is the access device 1 in the embodiment shown in FIG. 7 or FIG. 8, and the storage device 1403 is the storage device 2 in the embodiment shown in any one of FIG. 10 to FIG. 12. Alternatively, the access device 1402 may be the access device 1000 in the embodiment shown in FIG. 9, and the storage device 1403 may be the storage device 2000 in the embodiment shown in FIG. 13.

The user terminal 1401 is configured to send a data request carrying data information of target data to the access device 1402.

The access device 1402 is configured to obtain the data request sent by the user terminal 1401, and parse out and obtain the data information carried in the data request.

The access device 1402 is further configured to search for a storage device identifier and first authentication information that are associated with the data information, and send the first authentication information and the data information to the storage device 1403 corresponding to the storage device identifier.

The storage device 1403 is configured to perform authentication on the first authentication information, and after the authentication succeeds, obtain the target data indicated by the data information, and send the target data to the access device 1402.

The access device 1402 is further configured to obtain the target data sent by the storage device 1403, and send the target data to the user terminal 1401 to respond to the data request.

In an embodiment, the system further includes a management device 1404, and before the user terminal 1401 being configured to send a data request carrying data information of target data to the access device 1402, the system further includes:

the access device 1402, configured to obtain the target data sent by the user terminal 1401, and obtain a storage device identifier indicated by the management device 1404 for the target data;

the access device 1402, further configured to send the target data to the storage device 1403 corresponding to the storage device identifier;

the storage device 1403, configured to store the target data, and obtain second authentication information that is sent by the management device 1404 and that is associated with the target data; and the access device 1402, further configured to obtain the second authentication information synchronized by the management device 1404.

In an embodiment, when the storage device 1403 is configured to perform authentication on the first authentication information, and when the authentication succeeds, obtain the target data indicated by the data information and send the target data to the access device 1402, the storage device 1403 is configured to search for the second authentication information associated with the data information, and match the first authentication information with the second authentication information; and when the first authentication information matches and is consistent with the second authentication information, obtain the target data indicated by the data information and send the target data to the access device 1402.

In an embodiment, the system further includes:

the management device 1404, configured to when the target data is removed from the storage device 1403, recycle the second authentication information, and delete the second authentication information from the access device 1402 and the second authentication information from the storage device 1403 separately.

In this embodiment of this application, when obtaining the data request carrying the data information of the target data sent by the user terminal 1401, the access device 1402 may obtain the storage device 1403 identifier associated with the data information and may obtain the preset first authentication information associated with the data information, the first authentication information and the data information are sent to the storage device 1403 corresponding to the storage device identifier, so that the storage device 1403 performs authentication on the first authentication information, and after the authentication succeeds, the target data indicated by the data information is returned to the access device 1402, and finally, the access device 1402 sends the target data to the user terminal 1401 to respond to the data request. The first authentication information associated with the data information of the requested data is added, and the requested data can be obtained only after the authentication on the first authentication information succeeds, to avoid a case that erroneous data is obtained because the data is migrated or replaced with new other data, thereby ensuring accuracy and security of the requested data. The second authentication information is uniquely assigned to the target data in advance, so that during subsequent data requesting, the first authentication information is matched with the second authentication information, to further implement the data obtaining process, thereby effectively ensuring accuracy and security of the requested data. The used second authentication information is recycled, so that the authentication information is repeatedly used, thereby optimizing resource assignment in a distributed system and improving usability of the distributed system.

Figure 15:
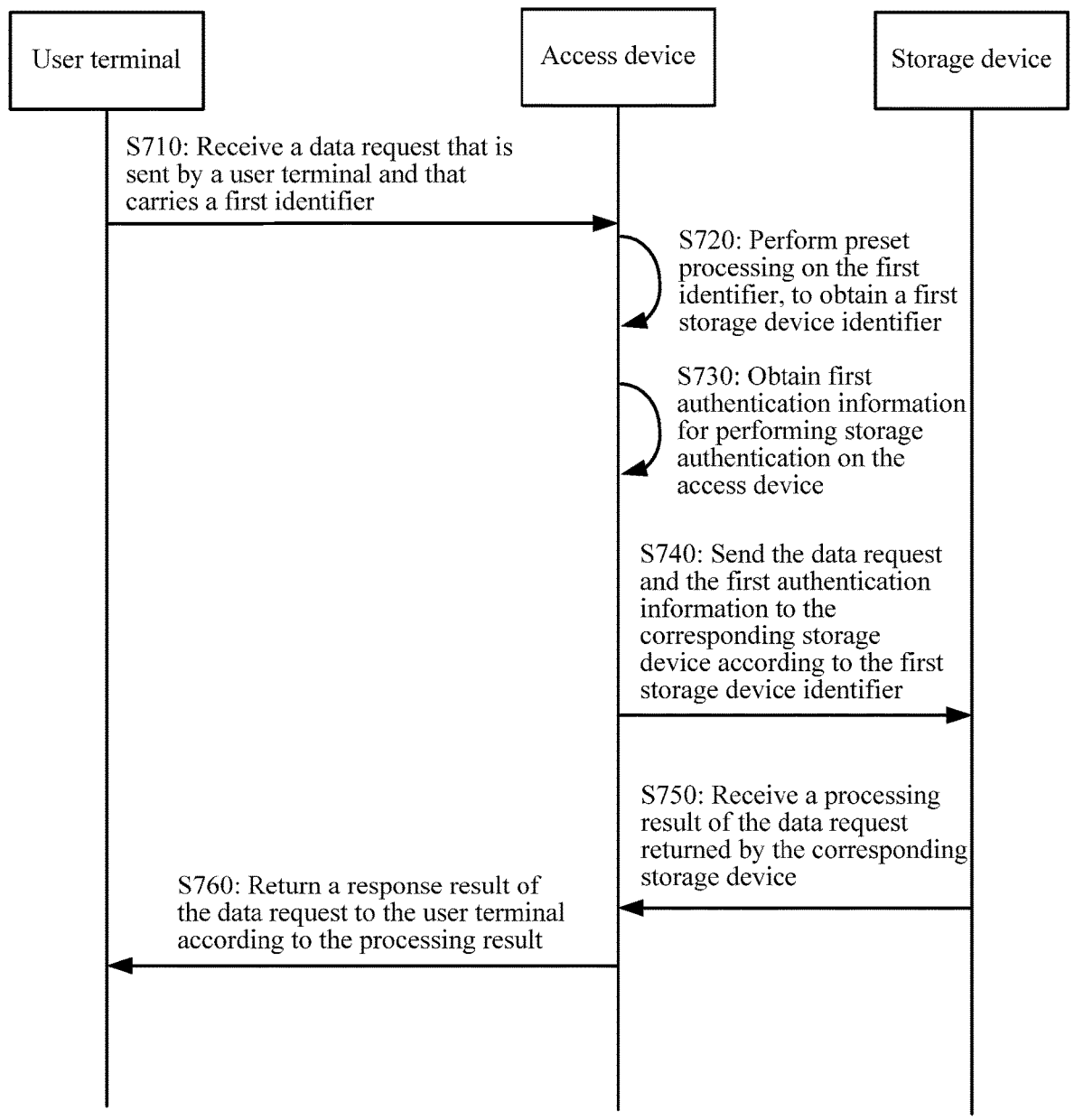
FIG. 15 is a schematic flowchart of yet another method for processing a data request according to an embodiment.

FIG. 15 is a schematic flowchart of yet another method for processing a data request according to an embodiment. As shown in FIG. 15, this embodiment provides a method for processing a data request, applied to an access device, including:

Step S710: Receive a data request that is sent by a user terminal and that carries a first identifier, where the data request is a storing request for storing target data or a read request for reading target data, and the first identifier is identifier that is generated by the user client according to preset rule and that is related to storage of the target data.

Step S720: Perform preset processing on the first identifier, to obtain a first storage device identifier, where the first storage device identifier is a device identifier of a storage device that stores the target data.

Step S730: Obtain first authentication information for performing storage authentication on the access device.

Step S740: Send the data request and the first authentication information to the corresponding storage device according to the first storage device identifier, where the first authentication information is used for performing the storage authentication on the access device by the corresponding storage device, and the data request is used for triggering the corresponding storage device to respond to the data request after the storage authentication succeeds.

Step S750: Receive a processing result of the data request returned by the corresponding storage device.

Step S760: Return a response result of the data request to the user terminal according to the processing result.

The access device provided by this embodiment is a device that can enable the user terminal to access the storage device.

Usually, according to the principle of proximity for storage, the storage device corresponding to the access device may be a storage device in proximity to the access device in terms of physical space or topological space.

In this embodiment, a data connection may be established between the access device and the user terminal. The user terminal may send a data request to the access device according to its demand. The data request herein includes: a storing request for storing data and a read request for reading data. In this embodiment, either to-be-stored data or to-be-read data is the target data to which this data request points.

Before the user terminal requests for storing data, an identifier for identifying storage of the target data is generated based on a preset rule. The identifier is referred to as a first identifier in this embodiment and may be used as an identifier for a subsequent query or operation performed by the user terminal on the target data. The first identifier is carried in either a storing request or a reading request. In some cases, the first identifier may be referred to as a key for operating the target data.

The access device receives the data request carrying the first identifier.

In step S720, the preset processing is performed on the first identifier. For example, function processing is performed the first identifier. The function herein may be a hash function, and hash processing is performed on the first identifier. In step S720, the MD5 algorithm may be used to perform hash processing on the first identifier. A function value obtained by the processing has a correspondence with the storage device identifier of the storage device. For example, the function value may be directly used as the storage device identifier, or a storage device identifier is obtained based on the correspondence between the function value and the storage device identifier. In this embodiment, the storage device identifier obtained by processing the first identifier is a first storage device identifier. The first storage device identifier herein may be a device identifier for storing the target data or a device identifier of a storage device that stores the target data. The device identifier may be an international mobile equipment identity (IMEI), or an Internet Protocol (IP) address, or a storage logic address or the like that is assigned by the management device and that identifies information, such as a sequence and/or a character string, of a device.

After determining the first storage device identifier of the storage device that responds to the data request, the access device needs to send the data request to the corresponding storage device. In this embodiment, first authentication information for performing storage authentication on the access device is also synchronously sent.

This first authentication information is authentication information for the access device. In this embodiment, no matter from which user terminal, for example, from a user terminal A and a user terminal B, the data request received by the access device is, if authentication information corresponding to the access device does not change, for data requests of the user terminal A and the user terminal B, same first authentication information is sent to the storage device.

In this way, the storage device corresponding to the first storage device identifier receives not only the data request, but also first authentication information for the access device.

Before responding to the data request, the storage device first performs authentication on the first authentication information. If an exception currently occurs in the access device, it is likely that the access device cannot provide correct first authentication information, and consequently, storage authentication may fail. If the storage authentication fails, the storage device refuses to respond to the data request, so that no matter whether data is stored or read, problems, such as a data processing error caused by the exception of the access device and a leakage caused by a data reading error, can be avoided.

In this embodiment, the first authentication information is directed to the access device instead of the target data or the data request. In this case, responding to the data request by using one access device may need only one piece of first authentication information. Apparently, if a quantity of pieces of authentication information is small, it is not needed to individually perform storage authentication on corresponding authentication information assigned for each piece of target data or a data request.

In addition, in this embodiment, the first authentication information is directed to the access device. If the access device performs transmission to a wrong storage device, it is likely that authentication on the first authentication information cannot succeed, to avoid a problem that because of a wrong write operation caused by a processing exception of the access device, for example, a wrong write operation on a storage device to which the access device does not have access, a corresponding storage device, in response to the write operation of the access device, overwrites data written by another access device, thereby improving reliability and robustness of data storage.

In this embodiment, no matter whether data is stored or read, it is needed to perform authentication with reference to the first authentication information.

In step S730, obtaining the first authentication information may include: locally querying for the first authentication information on the access device, or generating, by the access device according to a preset manner, the first authentication information based on a generation parameter. When performing authentication on first authentication information, the storage device may also generate, in a same manner, a piece of authentication information for performing storage authentication on the access device.

The storage device may perform corresponding processing on the data request, to form a processing result.

In this embodiment, the processing result includes: a first type of processing result, and a second type of processing result.

The first type of processing result is used for indicating whether storage authentication succeeds and whether to respond to the data request. The first type of processing result at least includes: an authentication failure.

The second type of processing result is used for indicating a result of processing the target data after the storage authentication succeeds. The second type of processing result includes: a processing result of a storage success or a storage failure in response to a storing request. The second type of storing result further includes: a processing result that is returned when a reading request is successfully responded to and that includes target data and a processing result when target data is not successfully read in response to the reading request.

The step S750 may include that: after receiving the second type of processing result, the access device can directly return the second type of result as a final response result for the data request to the user terminal.

The step S750 may include: after receiving the first type of processing result, the access device may repeatedly perform the step S720 to step S750 until the second type of processing result is received from the storage device, or repeatedly perform the step S720 to step S750 a predetermined quantity of times, and if the authentication on the first authentication information still fails after the predetermined quantity of times is reached, directly return a result indicating a response failure to the user terminal. The above are examples. In some cases, the access device may directly forward the processing result to the user terminal.

When the data request is a storing request, in step S740, the access device sends the to-be-stored target data to the storage device for storage.

When the data request is a reading request, in step S740, the carried data request does not include corresponding target data, and if the storage device finds by query the corresponding target data, in step S750, the access device would receive a processing result carrying the target data.

In some embodiments, the first authentication information includes first route information delivered by a management device to the access device, where the first route information is information generated by the management device according to a storage area assigned to the access device.

The first route information may include: a storage address of a start sub-area of the storage area and/or a storage address of an end sub-area of the storage area assigned to the access device, and the like.

The first route information may directly be the storage address of the start sub-area and the storage address of the end sub-area, may be information generated after processing the storage addresses and the like by using various functions such as a hash algorithm, or may be a storage address and the like assigned to an entire storage area of the access device.

In this embodiment, the first route information not only can notify the access device of information related to the storage area currently assigned by the management device to the access device, but also can be multiplexed as the first authentication information. In this case, the management device can notify the access device of the first authentication information without additionally delivering information. On the one hand, information multiplexing is implemented, and on the other hand, it is not needed to additionally increase signaling overhead of information exchange, and compatibility with the existing technology is strong.

Optionally, the method further includes:

determining whether the first storage device identifier is a preset storage device identifier according to the first route information, where the preset storage device identifier is a device identifier of a storage device assigned to the access device for data storage.

The step S740 may include: when the first storage device identifier is the preset storage device identifier, sending the data request and the first authentication information to the storage device corresponding to the first storage device identifier.

For example, the first storage device identifier obtained by processing the first identifier is obviously not located in the storage area corresponding to the first route information, indicating that the access device does not have operation access to the data or an error occurs in a process in which the access device calculates the first storage device identifier. Alternatively, when a fault occurs in either one or both of the access device and the user terminal, it is not needed to send the data request to the storage device, to reduce invalid loads of the data request of the storage device.

In some embodiments, the method further includes:

receiving first storage configuration information delivered by the management device for the access device, where the first storage configuration information at least includes: the first authentication information or generation information of the first authentication information.

The first storage configuration information includes the first authentication information or generation information of the first authentication information. The generation information herein may include a generation policy and a generation parameter. Data processing is performed on the generation parameter by using the generation policy, to obtain the first authentication information. The first storage configuration information may alternatively directly carry the first authentication information. For example, when the first authentication information is the first route information, the first storage configuration information only needs to directly include the first route information.

Figure 16:
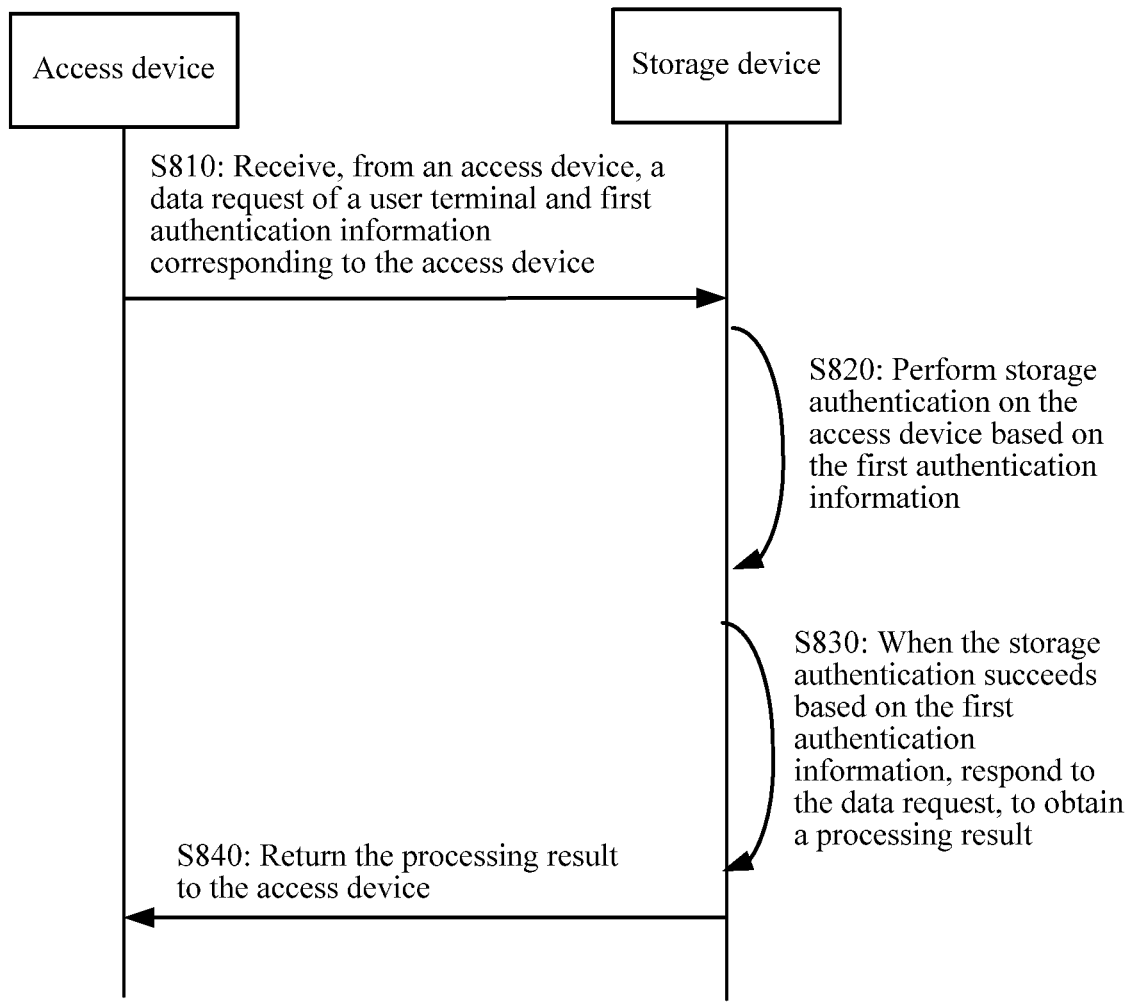
FIG. 16 is a schematic flowchart of still another method for processing a data request according to an embodiment.

FIG. 16 is a schematic flowchart of still another method for processing a data request according to an embodiment. As shown in FIG. 16, this embodiment provides a method for processing a data request, applied to a storage device, including:

Step S810: Receive, from an access device, a data request of a user terminal and first authentication information corresponding to the access device.

Step S820: Perform storage authentication on the access device based on the first authentication information.

Step S830: When the storage authentication succeeds based on the first authentication information, respond to the data request, to obtain a processing result.

Step S840: Return the processing result to the access device.

The method for processing a data request provided in this embodiment is a method applied to a storage device. While receiving the data request from the access device, the storage device also receives the first authentication information for the access device.

Before responding to the data request, it is needed to first perform storage authentication on the access device based on the first authentication information. Only after the storage authentication succeeds, the data request is responded to. In this way, it is equivalent to only when it is determined that the access device is normal, the data request is responded, to at least resolve problems of a storing exception and a reading exception caused by an exception of the access device.

Optionally, the method further includes:

receiving second storage configuration information for the access device from a management device; and obtaining second authentication information based on the second storage configuration information.

The step S820 may include: matching the first authentication information with the second authentication information; and when the first authentication information is consistent with the second authentication information, determining that the storage authentication succeeds.

The storage device receives in advance the second storage configuration information for the access device from the management device. The obtaining second authentication information based on the second storage configuration information may include directly extracting the second authentication information from the second storage configuration information. Alternatively, the second authentication information is generated according to the second storage configuration information. For example, when the second authentication information is generated according to the second storage configuration information, generation processing may be performed based on a generation parameter and a generation rule, to obtain the second storage configuration information. The generation parameter and the generation rule received by the storage device herein are consistent with a generation parameter and a generation rule received by the access device from the management device.

In step S820, the first authentication information is matched with the second authentication information. If the two pieces of authentication information matches each other and are consistent with each other, the storage authentication succeeds. Otherwise, it could be considered that the storage authentication fails.

In some embodiments, the obtaining second authentication information based on the second storage configuration information may include: obtaining second route information corresponding to the access device based on the second storage configuration information, where the second route information is generated by the storage device according to a storage area assigned by the management device to the access device.

If the first authentication information provided by the access device is the first route information, the step S820 may include: matching the first route information with the second route information, and performing storage authentication according to a matching result.

When the data request is a storing request, the step S830 may include:

when the storage authentication succeeds based on the first authentication information, storing the target data; and forming a storage record of the target data, where the storage record includes a correspondence between a storage location of the target data and the first identifier, so that subsequently, if the user terminal queries for the target data, after a reading request carrying the first identifier is received, the storage record may be queried for according to the first identifier, based on the correspondence in the storage record, the target data is read at the corresponding storage location, and the target data is returned to the access device.

When the data request is a reading request, the step S830 may include:

when the storage authentication succeeds based on the first authentication information, extracting a first identifier from the reading request;

querying for the correspondence by using the first identifier as a query basis and determining a storage location of the target data; and reading the target data at the storage location.

This embodiment further provides a computer storage medium, the computer storage medium storing a computer executable instruction, and the computer executable instruction being used for performing the method for processing a data request according to the foregoing one or more technical solutions, for example, performing any one or any combination of the methods for processing a data request shown in FIG. 1 to FIG. 5, FIG. 8, and FIG. 9.

The computer storage medium may be a storage medium such as a read-only memory, a random memory, a flash memory, a movable hard disk, or an optical disc, and the computer storage medium may be a non-transitory storage medium.

This embodiment provides processing device, the processing device being an access device or a storage device, including:

a transceiver, configured to perform data exchange with another device;

a memory, configured to store data; and a processor, connected to the transceiver and the memory separately and configured to perform any one or any combination of the methods for processing a data request shown in FIG. 1 to FIG. 5, FIG. 8, and FIG. 9 by executing a computer program located on the memory.

The transceiver may include different types of network interfaces. The network interfaces may include: optical cable interfaces, electric cable interfaces, receive and transmit antennas, and the like. The transceiver may be used for data exchange. The memory may be used for storage of different types of information.

The processor may be a central processing unit, a microprocessor, a digital signal processor, an application processor, a programmable array, a specific integrated circuit, or the like. The processor may be connected to the memory and the transceiver separately through bus interfaces such as an integrated circuit bus and configured to perform the method for processing a data request according to the foregoing one or more technical solutions by executing a computer executable instruction such as a computer program.

What is disclosed above are embodiments of this application, and is not intended to limit the scopes of the claims of this application. Therefore, equivalent variations made in accordance with the claims of this application shall fall within the scope of this application.

In the several embodiments provided in the present application, the disclosed device and method may be implemented in other manners. The described device embodiments are examples. For example, the unit division is a logical function division and may be other division during actual implementation. For example, multiple units or components may be combined or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separation parts may be or may not be physically separated. The part used as display unit may be or may not be a physical unit. That is, the units may be located in a same place, or may be distributed to many network units. Some or all of the units need to be selected according to actual requirements to implement the purpose of the solution of the embodiments.

In addition, functional units in the embodiments of this application may be all integrated in a processing module, each unit is separately used as a unit, or two or more units are integrated in a unit. The integrated unit may be implemented in a form of hardware, or may be implemented in form of hardware plus a software functional unit.

A person of ordinary skill in the art may understand that, some or all of steps for implementing the method embodiments may be implemented by using hardware related to a program instruction. The program may be stored in a computer readable storage medium. When the program is executed, the steps including the method embodiments are performed. However, the storage medium includes various types of media that may store program code, for example, a mobile storage device, a read-only memory (ROM), a random access memory (RAM), a magnetic disk, or an optical disk.

Alternatively, when the integrated unit of this application is implemented in a form of a software functional module and sold or used as an independent product, the integrated unit may be stored in a computer-readable storage medium. Based on such an understanding, the technical solutions of the embodiments of this application or the part contributing to the prior art may be implemented in a form of a software product. The computer software product is stored in a storage medium and includes several instructions for instructing a computer device (which may be a personal computer, a server, a network device, or the like) to perform all or some of the methods described in the embodiments of this application. The foregoing storage medium includes: any media that can store program code, such as a removable storage device, a ROM, a magnetic disk, or an optical disc.

What is disclosed above are embodiments of this application, and is not intended to limit the scopes of the claims of this application. Therefore, any embodiments made in accordance with the principles of this application shall fall within the scope of this application.

INDUSTRIAL PRACTICABILITY

In the technical solutions provided by the embodiments of this application, the storage device identifier of the storage device is determined according to the data information or the first identifier, the first authentication information is obtained, the first authentication information is sent to the corresponding storage device, and the storage device makes the response after the authentication succeeds, to ensure reliability of data processing through authentication, thereby producing a positive industrial effect. At the same time, the embodiments can be implemented by setting the corresponding computer executable instructions in the storage device, the access device, and the management device, so that the embodiments are strongly industrially feasible.

What is claimed is:

1. A method for processing a data request, the method being performed by an access device, and the method comprising:
    receiving, from a user terminal, the data request comprising data information of target data;
    obtaining the data information from the data request;
    searching for a storage device identifier and first authentication information, based on the data information;
    sending the first authentication information and the data information, to a storage device corresponding to the storage device identifier, to enable the storage device to perform authentication on the first authentication information, and to enable the storage device to, in response to the authentication succeeding, obtain the target data indicated by the data information,
    wherein the storage device identifier is assigned by a management device according to a resource utilization ratio of a current distributed storage in a process of storing the target data;
    on a condition that the authentication succeeds, the storage device obtains the target data indicated by the data information, and sends the target data to the user terminal, to respond to the data request, and
    on a condition that the authentication fails, the method further comprises causing the storage device to directly send a failure indicator of an access failure and the storage device denies access to the target data.

2. The method according to claim 1, further comprising, before the receiving the data request:
    receiving the target data, from the user terminal;
    receiving, from the management device, the storage device identifier for the target data;
    sending the target data, to the storage device corresponding to the storage device identifier, to enable the storage device, to store the target data and receive, from the management device, second authentication information that is associated with the target data; and
    receiving, from the management device, the second authentication information.

3. The method according to claim 2, wherein the storage device performs the authentication by searching for the second authentication information associated with the data information, and determining whether the first authentication information matches with the second authentication information, and
    in response to the first authentication information being determined to match with the second authentication information, the storage device obtains the target data indicated by the data information.

4. The method according to claim 2, wherein in response to the target data being removed from the storage device, the second authentication information is recycled by the management device, and the second authentication information is deleted from the access device and from the storage device separately.

5. The method according to claim 2, further comprising,
    receiving, from the user terminal, a request to cancel storage of the target data,
    recycling, by the management device, the second authentication information by placing the second authentication information into an information pool for use in subsequent data storage, and
    deleting the second authentication information from the access device and the second authentication information from the storage device separately.

6. The method according to claim 1, wherein the data request further comprises a first identifier that is generated by the user terminal, based on a preset rule, and that is related to storage of the target data,
    the data request is a storing request for storing the target data or a read request for reading the target data,
    the method further comprises performing preset processing on the first identifier, to obtain the storage device identifier of the storage device that stores the target data.

7. The method according to claim 6, wherein the performing the preset processing comprises performing hash processing on the first identifier, to obtain the storage device identifier.

8. The method according to claim 6, wherein the first authentication information comprises route information that is sent by the management device to the access device, and
    the route information is generated by the management device, based on a storage area that is assigned to the access device.

9. The method according to claim 8, further comprising:
    determining whether the storage device identifier is a preset storage device identifier, based on the route information, the preset storage device identifier being of a preset storage device that is assigned to the access device for data storage; and
    the sending the first authentication information and the data information comprises in response to the storage device identifier being determined to be the preset storage device identifier, sending the first authentication information and the data information, to the storage device corresponding to the storage device identifier.

10. The method according to claim 1, further comprising receiving, from a management device, storage configuration information for the access device, the storage configuration information comprising either one or both of the first authentication information or generation information of the first authentication information.

11. A method for processing a data request, the method being performed by a storage device, and the method comprising:
    receiving, from an access device, data information of target data and first authentication information associated with the data information, the data information being obtained by the access device from the data request that is received from a user terminal, and the first authentication information being searched for by the access device, based on the data information;

performing authentication on the first authentication information;
in response to the authentication succeeding, obtaining the target data indicated by the data information; and
sending the target data, to the access device, to enable the access device to send the target data to the user terminal to respond to the data request,
wherein a storage device identifier is assigned by a management device according to a resource utilization ratio of a current distributed storage in a process of storing the target data, and
in response to the authentication failing and the target data not being obtained, the method further comprises directly sending a failure indicator of an access failure when the authentication on the first authentication information fails and the storage device denies access to the target data.

12. The method according to claim 11, further comprising, before the receiving the data information and the first authentication information:
receiving the target data, from the access device, the target data being received by the access device from the user terminal, the target data being sent by the access device to the storage device corresponding to the storage device identifier for the target data, and the storage device identifier being received by the access device from a management device;
storing the target data; and
receiving, from the management device, second authentication information that is associated with the target data.

13. The method according to claim 12, wherein the performing the authentication comprises:
searching for the second authentication information associated with the data information; and
determining whether the first authentication information matches with the second authentication information, and
wherein the obtaining the target data comprises, in response to the first authentication information being determined to match with the second authentication information, obtaining the target data indicated by the data information.

14. The method according to claim 12, further comprising,
receiving, from the user terminal, a request to cancel storage of the target data,
recycling, by the management device, the second authentication information by placing the second authentication information into an information pool for use in subsequent data storage, and
deleting the second authentication information from the access device and the second authentication information from the storage device separately.

15. The method according to claim 11, further comprising:
receiving, from a management device, storage configuration information for the access device; and
obtaining second authentication information from the storage configuration information,
wherein the performing the authentication comprises determining whether the first authentication information matches with the second authentication information, and
wherein the obtaining the target data comprises, in response to the first authentication information being determined to match with the second authentication information, obtaining the target data indicated by the data information.

16. The method according to claim 15, wherein the obtaining the second authentication information comprises obtaining route information corresponding to the access device, based on the storage configuration information, and
the route information is generated by the storage device, based on a storage area that is assigned by the management device to the access device.

17. An access device, comprising:
at least one memory configured to store computer program code; and
at least one processor configured to access the at least one memory and operate according to the computer program code, the computer program code comprising:
data information obtaining code configured to cause the at least one processor to:
receive, from a user terminal, a data request comprising data information of target data; and
obtain the data information from the data request;
information sending code configured to cause the at least one processor to:
search for a storage device identifier and first authentication information, based on the data information; and
send the first authentication information and the data information, to a storage device corresponding to the storage device identifier, to enable the storage device to perform authentication on the first authentication information, and to enable the storage device to, in response to the authentication succeeding, obtain the target data indicated by the data information;
first data sending code configured to cause the at least one processor to:
receive, from the storage device, the target data; and
send the target data to the user terminal, to respond to the data request wherein the storage device identifier is assigned by a management device according to a resource utilization ratio of a current distributed storage in a process of storing the target data; and
authentication failure notification code configured to cause the at least one processor to cause the storage device to directly send a failure indicator of an access failure when the authentication on the first authentication information fails and the storage device denies access to the target data.

18. The access device according to claim 17, further comprising:
identifier obtaining code configured to
receive the target data, from the user terminal; and
receive, from the management device, the storage device identifier for the target data;
second data sending code configured to send the target data, to the storage device corresponding to the storage device identifier, to enable the storage device to store the target data and receive, from the management device, second authentication information that is associated with the target data; and
authentication information obtaining code configured to receive, from the management device, the second authentication information.

19. The access device according to claim 18, wherein the storage device performs the authentication by searching for the second authentication information associated with the data information, and determining whether the first authentication information matches with the second authentication information, and in response to the first authentication information being determined to match with the second authentication information, the storage device obtains the target data indicated by the data information.

20. The access device according to claim 18, wherein in response to the target data being removed from the storage device, the second authentication information is recycled by the management device, and the second authentication information is deleted from the access device and from the storage device separately.

* * * * *